US008922887B2

(12) United States Patent
Cooper

(10) Patent No.: US 8,922,887 B2
(45) Date of Patent: Dec. 30, 2014

(54) IMAGING DISTAL END OF MULTIMODE FIBER

(71) Applicant: Spectral Applied Research Inc., Richmond Hill (CA)

(72) Inventor: David James Frederick Cooper, Newmarket (CA)

(73) Assignee: Spectral Applied Research Inc., Richmond Hill, Ontario (CA)

( * ) Notice: Subject to any disclaimer, the term of this patent is extended or adjusted under 35 U.S.C. 154(b) by 0 days.

(21) Appl. No.: 14/156,742

(22) Filed: Jan. 16, 2014

(65) Prior Publication Data

US 2014/0133017 A1     May 15, 2014

Related U.S. Application Data

(62) Division of application No. 12/961,749, filed on Dec. 7, 2010, now Pat. No. 8,670,178.

(60) Provisional application No. 61/267,725, filed on Dec. 8, 2009, provisional application No. 61/411,434, filed on Nov. 8, 2010.

(51) Int. Cl.
    *G02B 21/06*    (2006.01)
    *G02B 21/00*    (2006.01)

(52) U.S. Cl.
    CPC ............ *G02B 21/06* (2013.01); *G02B 21/0032* (2013.01)
    USPC .......................................... 359/385; 359/368

(58) Field of Classification Search
    None
    See application file for complete search history.

(56) References Cited

U.S. PATENT DOCUMENTS

| 5,428,475 A | 6/1995 | Tanaami et al. |
| 5,579,157 A | 11/1996 | Tanaami et al. |
| 5,713,364 A * | 2/1998 | DeBaryshe et al. .......... 600/476 |

(Continued)

FOREIGN PATENT DOCUMENTS

| DE | 10350243 | 5/2005 |
| EP | 0764866 | 3/1997 |

(Continued)

OTHER PUBLICATIONS

Luck, Wulf, Extended European Search Report for EP09405217.2, Mar. 5, 2010.

(Continued)

*Primary Examiner* — Arnel C Lavarias
(74) *Attorney, Agent, or Firm* — Integral Intellectual Property Inc.; Miriam Paton

(57) ABSTRACT

Where a multimode fiber is used for light delivery in a microscope system and a transverse distribution of light exiting a distal end of the fiber is substantially uniform, the distal end is imaged onto a plane of a sample to be probed by the microscope system, or at a conjugate plane. Alternatively, the distal end is imaged onto a plane sufficiently close to the sample plane or the conjugate plane such that a radiant intensity of light at the sample plane or the conjugate plane is substantially uniform. In the case of a multi-focal confocal microscope system, the distal end of the multimode fiber is imaged onto a plane of a segmented focusing array. Alternatively the distal end is imaged onto a plane sufficiently close to the segmented focusing array plane such that a radiant intensity of the light at the segmented focusing array plane is substantially uniform.

19 Claims, 6 Drawing Sheets

(56) References Cited

U.S. PATENT DOCUMENTS

| | | | |
|---|---|---|---|
| 5,717,519 A | 2/1998 | Sugiyama et al. | |
| 5,847,867 A | 12/1998 | Sugiyama et al. | |
| 5,917,971 A | 6/1999 | Slater | |
| 5,952,668 A | 9/1999 | Baer | |
| 6,018,413 A * | 1/2000 | Oka | 359/326 |
| 6,111,635 A | 8/2000 | Iida et al. | |
| 6,185,036 B1 | 2/2001 | Tanaami | |
| 6,188,812 B1 | 2/2001 | Kao et al. | |
| 6,248,995 B1 | 6/2001 | Tanaami et al. | |
| 6,300,618 B1 | 10/2001 | Tanaami et al. | |
| 6,456,369 B1 | 9/2002 | Ohki et al. | |
| 6,486,458 B1 | 11/2002 | Schoeppe et al. | |
| 6,603,780 B2 | 8/2003 | Miyai | |
| 6,717,723 B2 | 4/2004 | Arai | |
| 6,747,769 B2 | 6/2004 | Hamano et al. | |
| 6,909,542 B2 | 6/2005 | Sasaki | |
| 6,982,824 B2 | 1/2006 | Kei et al. | |
| 7,002,737 B1 | 2/2006 | Akiyama et al. | |
| 7,190,514 B2 | 3/2007 | Mikuriya et al. | |
| 7,205,519 B2 | 4/2007 | Ishida et al. | |
| 7,211,777 B2 | 5/2007 | Ishida et al. | |
| RE39,751 E | 7/2007 | Kitagawa | |
| 7,349,152 B2 | 3/2008 | Kei | |
| 7,400,446 B2 | 7/2008 | Mikuriya et al. | |
| 7,592,582 B2 | 9/2009 | Mikuriya et al. | |
| 8,670,178 B2 * | 3/2014 | Cooper | 359/385 |
| 2003/0151742 A1 | 8/2003 | Silvermintz et al. | |
| 2004/0182710 A1 | 9/2004 | Tanammi | |
| 2006/0017920 A1 | 1/2006 | Tsuchiya et al. | |
| 2006/0033988 A1 | 2/2006 | Mikuriya et al. | |
| 2006/0050375 A1 | 3/2006 | Mikuriya et al. | |
| 2006/0072191 A1 | 4/2006 | Akiyama et al. | |
| 2007/0096014 A1 | 5/2007 | Mikuriya et al. | |
| 2007/0216999 A1 | 9/2007 | Tanibata et al. | |
| 2008/0037114 A1 | 2/2008 | Sheblee et al. | |
| 2010/0142041 A1 | 6/2010 | Berman | |
| 2010/0195868 A1 | 8/2010 | Lu | |

FOREIGN PATENT DOCUMENTS

| | | |
|---|---|---|
| EP | 1510851 | 3/2005 |
| EP | 1538470 | 6/2005 |
| EP | 1245986 | 12/2005 |
| JP | 5060980 | 3/1993 |
| JP | 5210051 | 8/1993 |
| JP | 5332718 | 12/1993 |
| JP | 5341191 | 12/1993 |
| JP | 6235865 | 8/1994 |
| JP | 6242380 | 9/1994 |
| JP | 6308390 | 11/1994 |
| JP | 7199074 | 8/1995 |
| JP | 8271225 | 10/1996 |
| JP | 9021959 | 1/1997 |
| JP | 9061719 | 3/1997 |
| JP | 9080312 | 3/1997 |
| JP | 9166751 | 6/1997 |
| JP | 9265043 | 10/1997 |
| JP | 9297267 | 11/1997 |
| JP | 9329748 | 12/1997 |
| JP | 10026735 | 1/1998 |
| JP | 10153737 | 6/1998 |
| JP | 10161030 | 6/1998 |
| JP | 10206739 | 8/1998 |
| JP | 11006961 | 1/1999 |
| JP | 11133306 | 5/1999 |
| JP | 11183803 | 7/1999 |
| JP | 11202217 | 7/1999 |
| JP | 11305140 | 11/1999 |
| JP | 2000010010 | 1/2000 |
| JP | 2000147384 | 5/2000 |
| JP | 2000206412 | 7/2000 |
| JP | 2001051200 | 2/2001 |
| JP | 2001228402 | 8/2001 |
| JP | 2002072102 | 3/2002 |
| JP | 2002090627 | 3/2002 |
| JP | 2002221663 | 8/2002 |
| JP | 2003121746 | 4/2003 |
| JP | 2003156698 | 5/2003 |
| JP | 2003270543 | 9/2003 |
| JP | 2004093721 | 3/2004 |
| JP | 2004317704 | 11/2004 |
| JP | 2004354671 | 12/2004 |
| JP | 2005037690 | 2/2005 |
| JP | 2005070689 | 3/2005 |
| JP | 2005148454 | 6/2005 |
| JP | 2005233802 | 9/2005 |
| JP | 2005234030 | 9/2005 |
| JP | 2005338136 | 12/2005 |
| JP | 2006058321 | 3/2006 |
| JP | 2006084960 | 3/2006 |
| JP | 2006091445 | 4/2006 |
| JP | 2006276561 | 10/2006 |
| JP | 2006343606 | 12/2006 |
| JP | 2006350004 | 12/2006 |
| JP | 2006350005 | 12/2006 |
| JP | 2007101910 | 4/2007 |
| JP | 2007187945 | 7/2007 |
| JP | 2007199458 | 8/2007 |
| JP | 2007219121 | 8/2007 |
| JP | 2007248602 | 9/2007 |
| WO | 03026831 | 4/2003 |

OTHER PUBLICATIONS

Saito, Kenta et al., "A Mercury Arc Lamp-Based Multi-Color Confocal Real Time Imaging System for Cellular Structure and Function", Cell Structure and Function 33: 133-141 (2008), 2008 by Japan Society for Cell Biology.

St-Jean, Carole, ISR and WOSA for International Application PCT/CA2010/001965.

Green, David, First Office Action for CA 2,779,146, Jul. 4, 2012.

Lavarias, Arnel C., Notice of Allowance for U.S. Appl. No. 12/961,749, Nov. 15, 2013.

Lavarias, Arnel C., Restriction Requirement for U.S. Appl. No. 12/961,749, Aug. 6, 2013.

Windecker, Robert, Extended European Search Report for EP10835346, Apr. 26, 2013.

Windecker, Robert, First Exam Report for EP 10835346.7, May 2, 2014.

* cited by examiner

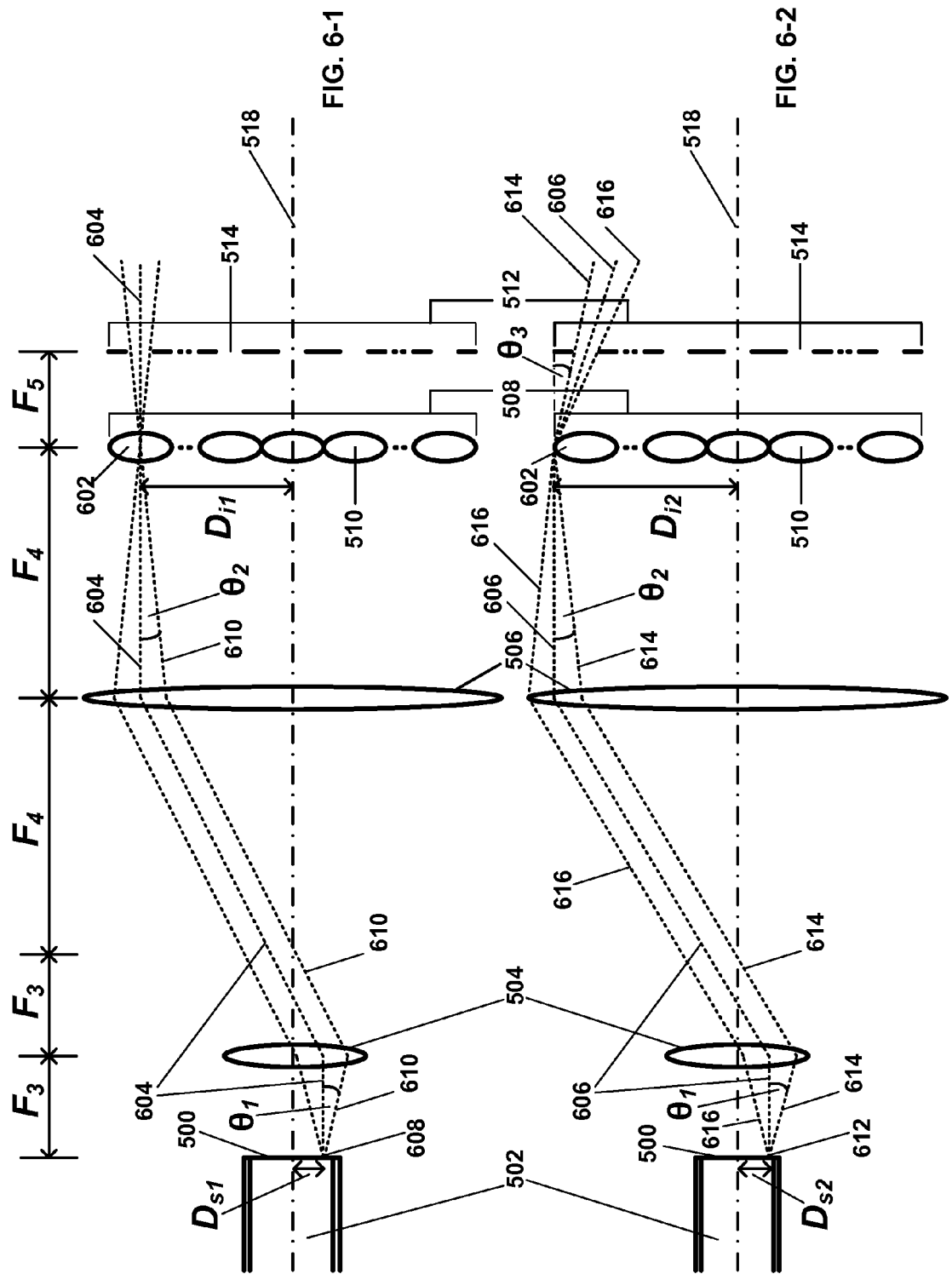

IMAGING DISTAL END OF MULTIMODE FIBER

TECHNICAL FIELD

This disclosure is generally related to the technical field of optical microscopy.

BACKGROUND

Optical microscopy involves the projection of light or radiation onto a sample, and the subsequent detection of reflected, scattered or fluorescence light from the sample.

One example of an optical microscope system is a traditional point scanning confocal microscope. In point scanning confocal microscopy, a single diffraction-limited point of light is projected onto a sample. By imaging that point onto a single element detector, the reflected, scattered or fluorescence light originating from that point in the sample can be measured. A single pinhole placed at a conjugate image plane located between the sample and the detector rejects out of focus light and creates the confocal effect. By scanning the point of light in a manner designed to illuminate the focal plane, for example, by raster scanning, an image of the sample can be constructed point by point. By moving the focal plane optically or by moving the sample, multiple focal planes can be imaged and a 3D image constructed.

The use of optical fibers for light delivery in optical microscopes has been established for many years. Throughout this document, the term "fiber" means "optical fiber". For traditional point scanning confocal microscopy, the only fiber that can be used effectively for illumination of the sample is a single mode fiber. A single mode fiber is a fiber that is designed for the transmission of a single spatial mode of light as a carrier. This mode of light may contain a variety of different wavelengths, although the range of wavelengths that can be transmitted is a function of the cross-sectional dimensions of the core of the fiber. Typical single mode fibers with cores of circular cross section have core diameters only slightly larger than the wavelengths of light that they transmit. For example, a fiber that transmits in a band around 488 nm has a core diameter of approximately 3.5 µm. Because of the small diameter of the fiber core, single mode fibers are used most often with laser sources. Other sources of radiation are difficult or impossible to couple into single mode fibers with good efficiency.

The cone angle of light that can be coupled into and is emitted from a single mode fiber is related to the numerical aperture (NA) of the fiber. The NA of a single mode fiber is a function of the refractive indices of the fiber core and cladding. The distribution of light emitted from a single mode fiber is well approximated by a Gaussian shape, the width of which is determined by the NA and by the core diameter of the fiber as well as by the wavelength of the light.

The light that is emitted from the distal end of a single mode fiber may be considered equivalent to light that is emitted from a diffraction-limited source. This fiber tip is re-imaged through the pinhole and onto the sample at or near its diffraction-limited size.

FIG. 1 illustrates example optics for projecting light from a distal end 100 of a single mode fiber 102 with a core diameter $D_F$ and numerical aperture $NA_F$ (related to the illustrated half-angle $\theta_1$) to a single pinhole 108 of a diameter $D_P$. The optics include a lens 104 having a focal length $F_1$ and a lens 106 having a focal length $F_2$. The light exits the single mode fiber 102 with a spread of angles given by the numerical aperture $NA_F$ of the single mode fiber 102. In general, a numerical aperture NA of a fiber is expressed by Eqn. 1 as:

$$NA = n \sin \theta, \quad (1)$$

where n is a refractive index of the surrounding medium to which the light exits from the distal end of the fiber, exit angle $\theta$ is the angle of divergence of light with respect to an optical axis of the fiber, and sin refers to the trigonometric sine function. In the case that the surrounding medium is air, the refractive index n is equal to one, that is n=1. For small angles, $\theta$, and in air, the numerical aperture NA and exit angle $\theta$ are approximately equal, that is $NA \approx \theta$. The term numerical aperture NA has two definitions when used with fibers. The numerical aperture NA may be defined as a function of the refractive indices of the core and cladding or may be defined as in Eqn. 1. In the ray optics approximation the two definitions are equivalent. In practice, the numerical aperture NA as defined by Eqn. 1 is often less than the numerical aperture NA as defined by the refractive indices of the core and cladding. Throughout this document, the numerical aperture NA is defined by Eqn. 1 unless explicitly noted otherwise. By placing the distal end 100 of the single mode fiber 102 the distance $F_1$ from the lens 104, light passing through the lens 104 is collimated. A diameter of the lens 104 should be large enough to capture the light emitted from the distal end 100 of the fiber 102. By placing the lens 106 at the distance $F_2$ from the pinhole 108, the collimated light incident on the lens 106 is focused by the lens 106 through the pinhole 108, as illustrated by half-angle $\theta_2$.

Typically, it is desired in a confocal microscope imaging system for the pinhole spot to be imaged at or near the diffraction limit of the microscope. To produce the minimum imaged spot size, the light transmitted through the pinhole 108 should be the same or larger than the largest numerical aperture $NA_{MS}$ of the microscope as measured at the image plane where the pinhole 108 is located. If the numerical aperture of light exiting the pinhole is larger than numerical aperture $NA_{MS}$ of the microscope, then the minimum imaged spot size can be achieved, however some of the light will be rejected by the microscope optics. Ideally, the numerical aperture of light exiting the pinhole should closely match the numerical aperture $NA_{MS}$ of the microscope so that the optimum resolution and light transmission to the sample can be achieved. The diameter $D_P$ of the pinhole 108 should be chosen so that the light exits the pinhole 108 at an angle $\theta_3$ given by the numerical aperture $NA_{MS}$ of the microscope as determined by optical diffraction theory. That is, $NA_{MS} = n \sin \theta_3$.

The focal length $F_1$ of the lens 104 and the focal length $F_2$ of the lens 106 should be chosen to provide an appropriate magnification M of the light exiting the single mode fiber 102 so that the focused light on the pinhole 108 just fills the pinhole diameter $D_P$. For a diameter $D_F$ of light exiting the fiber 102, this magnification M is expressed by Eqn. 2 as:

$$M = \frac{D_P}{D_F} = -\frac{F_2}{F_1}. \quad (2)$$

The negative sign indicates that the image of the distal end 100 of the single mode fiber 102 at the plane of the pinhole 108 is inverted. The exact value of the magnification M may be adjusted in practice to fine-tune the trade-off between resolution and light transmission.

In order to achieve both near-diffraction-limited imaging and high light transmission to a sample using a point scanning confocal microscope, the fiber used to deliver radiation from the radiation source to the microscope should be a single mode fiber. If the single mode fiber 102 of FIG. 1 was replaced with a larger diameter fiber, the spot size produced at the plane of the pinhole 108 would be too large to efficiently pass through the pinhole 108. While the magnification M could be reduced to permit the light to efficiently pass through the pinhole 108, for example, by changing one or both of the focal lengths $F_1$ and $F_2$, this would cause a corresponding increase in the numerical aperture of the light exiting the pinhole 108. This mismatch in the numerical aperture of the light exiting the pinhole 108 and the numerical aperture $NA_{MS}$ of the microscope would reduce the amount of light reaching the sample to be imaged. Alternatively, the pinhole diameter $D_P$ could be increased to allow more light through the pinhole 108 and more efficient light transmission to the sample without changing the magnification M, but this would result in a larger spot size and lower resolution. Thus, the use of a non-single mode fiber in a single point scanning confocal microscope would require either a reduction in the system resolution, a reduction in light transmission to the sample, or a combination of both.

A recent development in optical microscopy has been the parallel application of the confocal technique. By the use of various optical means, a plurality of near-diffraction-limited illumination points are projected onto or into the sample. Each of these points is imaged through a corresponding pinhole at a conjugate focal plane onto an image sensor of a detector, such as a high-sensitivity imaging camera. In effect, such a system operates as a plurality of point scanning confocal systems operating in parallel. Several commercial implementations of this concept exist on the market today and can be referred to in general as multiplexed confocal systems.

One implementation of a multiplexed confocal system uses a spinning disk comprising a pattern of several thousand pinholes. An example of one such spinning disk confocal system is one which comprises a Nipkow disk. The use of a multiplexed confocal system employing the Nipkow disk method with microlenses has been disclosed in, for example, U.S. Pat. No. 7,592,582 to Mikuriya et al. The microlenses create a plurality of focal points. A confocal system which creates multiple focal points using microlenses, micromirrors or other focusing elements may be referred to as a multi-focal confocal system and forms a subset of multiplexed confocal systems.

In the instrument described in U.S. Pat. No. 7,592,582, the exciting laser light is coupled to the incident end of an optical fiber by a condenser lens and is guided by the optical fiber to an inlet of a confocal scanner unit. A diverging beam of exciting light emitted from the distal end of the optical fiber is converted into a collimated beam by a collimating lens. The collimated beam falls on a disk with a microlens array that focuses excitation laser light onto a pinhole disk (Nipkow disk) mounted on the same axis in such a way that each lens focuses its light onto a corresponding pinhole. Multiple exciting light beams are converged to a sample by an objective lens. Fluorescence and/or scattered light and/or reflected light originating from the sample passes through the objective lens again, returns through the same pinholes and is reflected by a dichroic mirror positioned between the microlens disk and the Nipkow disk. The image is then focused onto an image sensor by a relay lens.

In such an apparatus, the Nipkow disk is co-rotated with the microlens disk at a constant speed, and the converged points of light on the sample are scanned with the pinholes moved by the rotation. A plane of the Nipkow disk, a plane to be observed in the sample, and an image sensor plane are arranged to be conjugate with each other optically. Therefore, an optically sectioned image, that is a confocal image of the sample, is formed on the image sensor. Such a system as described above is made by Yokogawa Electric Corporation of Japan and given designations such as CSU-10, CSU-21, CSU-22 and CSU-X1.

Other implementations of multi-focal confocal systems using microlenses exist where the key differences are in the geometry of the microlens patterns and the scanning mechanisms for moving the microlenses and pinholes. An example of such a system is called the Infinity and is built by VisiTech International Ltd. of Sunderland, United Kingdom.

Illumination methods for multi-focal confocal systems are similar to traditional point scanning systems and, until very recently, have used single mode fibers. In this case, the microlenses image the distal end of the fiber to many parallel pinholes at or near the diffraction limit. As with confocal point scanning systems, the typical radiation source for multi-focal confocal systems is a laser or multiple lasers.

There are disadvantages to using single mode fibers for some applications. Systems using single mode fibers are, in practice, restricted to radiation sources that emit light with small etendue, such as lasers with good beam quality, for example, beam quality factor $M^2<1.2$. Laser sources with good beam quality can be coupled to single mode fibers with coupling efficiencies of approximately 45% to 85%, although the efficiency in practice is sometimes less. Lasers with lesser beam quality couple with even lower efficiencies. Single mode fibers can only operate as such over a limited spectral range. Above a given upper cutoff wavelength the fiber core is too small to transmit light with low losses. Below a lower cutoff wavelength, the light is no longer transmitted in a single mode. The Gaussian distribution of the single mode fiber output intensity is less than ideal for systems requiring even illumination. Only the central part of the Gaussian beam is often used, such that the variation in intensity is less than some amount, for example 20%. In such systems a compromise between uniformity in light distribution across an image plane and the light utilization efficiency is required because the peripheral part of the Gaussian beam is abandoned.

Another disadvantage of systems that use single mode fibers is the requirement for high thermal, mechanical, and temporal stability of the laser-to-fiber alignment and the high manufacturing cost of such stable systems. Designing a means of providing stable laser-to-fiber coupling, and the creation of systems coupling multiple lasers to a single mode fiber, can be challenging.

As an alternative to using single mode fibers for delivery of radiation in optical microscopes, the use of multimode fibers has recently been contemplated. A multimode fiber is an optical fiber that is designed to carry multiple light ray paths or modes concurrently over a broad spectrum of wavelengths. It can be thought of simply as a long light tube. The use of a multimode fiber may reduce the sensitivity of the coupling between the radiation source and fiber to mechanical and temperature influences, thereby enabling a variety of radiation sources and wavelengths to be used for illumination in an optical microscope.

In "A Mercury Arc Lamp-Based Multi-Color Confocal Real Time Imaging System for Cellular Structure and Function", *Cell Structure and Function*, vol. 3, pages 133-141, 2008), Saito et al. describes the use of a multimode fiber with a 1 mm core diameter to couple an arc lamp to a Yokogawa CSU-10. The efficiency of the light coupled from the end of the multimode fiber through the CSU is reported to be 1%. While it was not clearly defined how this measurement was made, this number represents a low efficiency of light utilization. Saito et al. do not use this fiber with a laser but only with a broadband arc lamp source. Furthermore, with the use of such a large-diameter fiber, much of the lost light is scattered from the back surface of the pinhole disk, thus leading to a higher potential for a loss of contrast.

Use of a multimode fiber to efficiently deliver light emitted from a radiation source to a multi-focal confocal microscope has been disclosed by Berman in U.S. Patent Publication 2010/0142041. Berman discloses a method of selecting a core diameter and a numerical aperture of a multimode fiber such that light emitted from a distal end of the multimode fiber is transmitted through the confocal pinhole array with reasonable efficiency.

Typically, the intensity of light emitted from a distal end of a multimode fiber decreases at points further from the optical axis of a multimode fiber in the transverse plane. Therefore, a trade-off is made between light utilization efficiency and uniformity of illumination of the microscope sample. This trade-off may be realized by limiting the sample illumination to light from the central area of the collimated beam. Illuminating a smaller area may result in more uniform illumination but may use a smaller fraction of the light from the multimode fiber. Illuminating a larger area may result in better light utilization efficiency but may reduce the uniformity of the illumination.

SUMMARY

In the distant past, when light sources were weak, a filament was used to illuminate a sample to be imaged by a microscope. If the filament was imaged onto the sample plane, the intensity profile of the image mirrored the intensity profile of the filament. Known as "critical illumination", this was useful for achieving very bright illumination on a very small spot, but had limited applications due to its inability to provide uniform illumination of the entire sample or of a portion of the sample that is larger than a very small spot. More traditionally, the optical system coupling the filament to the sample plane was used to defocus the illumination, yielding a weaker but more uniform illumination of the sample. This is known as "Köhler illumination." In view of the desire for substantially uniform illumination of a sample to be imaged, microscope systems using optical fibers for delivery of light continue to be configured for Köhler illumination, so that the distal end of the optical fiber is defocused at the sample plane.

As described in more detail below, the inventor proposes imaging the distal end of a multimode fiber onto a sample plane. A sample plane is a plane in a sample to be probed by a microscope. Where a transverse distribution of light exiting the distal end of the multimode fiber is substantially uniform, a radiant intensity of the light forming the image of the distal end at the sample plane is also substantially uniform. The radiant intensity of the light at the sample plane is substantially uniform as long as the distal end is imaged sufficiently close to the sample plane, even if the distal end is not imaged precisely onto the sample plane. Substantially uniform illumination of a sample to be probed by a microscope is therefore achievable where (i) the transverse distribution of light exiting the distal end of the multimode fiber is substantially uniform and (ii) a light-coupling unit that couples the multimode fiber to the microscope is configured to image the distal end of the multimode fiber onto or sufficiently close to the sample plane. Persons of ordinary skill in the art will appreciate that substantially uniform illumination of a sample is also achievable when, instead of or in addition to imaging the distal end of the multimode fiber onto or sufficiently close to the sample plane, the light-coupling unit images the distal end of the multimode fiber onto or sufficiently close to a plane that is optically conjugate to the sample plane.

The efficiency of the illumination may be improved, for example, by using a light-coupling unit that is further configured to provide a magnification such that an area of substantially uniform illumination on the sample plane is not substantially bigger than an imaged area of the sample plane that is imaged by any active region of a detector, such as a high-sensitivity imaging camera. The active region of the detector may be understood to be that portion of an image sensor within the detector that may be activated by light received from anywhere within a field of view of the microscope.

As described in more detail below, for the case of a multi-focal confocal subsystem that comprises a segmented focusing array and an illumination aperture array, the inventor proposes imaging the distal end of a multimode fiber onto the plane of the segmented focusing array. The illumination aperture array is imaged to the sample plane. Where a transverse distribution of light exiting the distal end of the multimode fiber is substantially uniform, a radiant intensity of the light forming the image of the distal end at the plane of the segmented focusing array is also substantially uniform. The radiant intensity of the light at the plane of the segmented focusing array is substantially uniform as long as the distal end is imaged sufficiently close to the plane of the segmented focusing array, even if the distal end is not imaged precisely onto the plane of the segmented focusing array. Substantially uniform illumination of the sample after a complete scan of the illumination apertures is therefore achievable where (i) the transverse distribution of light exiting the distal end of the multimode fiber is substantially uniform and (ii) a light-coupling unit in the multi-focal confocal subsystem that couples the multimode fiber to the segmented focusing array is configured to image the distal end of the multimode fiber onto or sufficiently close to the plane of the segmented focusing array.

The efficiency of the illumination may be improved, for example, by using a light-coupling unit that is further configured to provide a magnification such that an area of substantially uniform illumination on the plane of the segmented focusing array is not substantially bigger than an imaged area of the sample plane that is imaged by any active region of a detector, such as a high-sensitivity imaging camera. The active region of the detector may be understood to be that portion of an image sensor within the detector that may be activated by light received from anywhere within a field of view of the microscope. The efficiency of the illumination may be improved, for example, where the multimode fiber, the light-coupling unit, the segmented focusing array and the illumination aperture array are configured such that light exiting the distal end of the multimode fiber parallel to an optical axis of the multimode fiber is focused by focusing elements of the segmented focusing array onto the centers of the corresponding illumination apertures. The efficiency of the illumination may be improved, for example, where the dimensions of the cross section of the core of the multimode fiber and the numerical aperture of the multimode fiber satisfy a particular relationship to the numerical aperture $NA_{MS}$ of the microscope and properties of the segmented focusing array and the illumination aperture array.

The multimode fiber may have a core of circular cross section, square cross section, rectangular cross section, or any other suitable cross section. A step-index multimode fiber is an example of a multimode fiber for which the transverse distribution of light exiting the distal end is substantially uniform. It is contemplated that other multimode fibers also exhibit the behavior that the transverse distribution of light exiting the distal end is substantially uniform. In the expression "transverse distribution of light exiting the distal end of the multimode fiber", the term "transverse" means transverse to an optical axis of the multimode fiber.

The methods and systems described herein may have a wide variety of applications in other areas of optical microscopy, including, but not limited to, wide field and bright field illumination, fluorescence recovery after photobleaching (FRAP), fluorescence lifetime imaging (FLIM), structured illumination (SIM), photo-activated localization microscopy (PALM) and stochastic optical reconstruction microscopy (STORM).

BRIEF DESCRIPTION OF THE DRAWINGS

The technology described herein is illustrated by way of example and not limitation in the figures of the accompanying drawings, in which like reference numerals indicate corresponding, analogous or similar elements, and in which:

FIG. 4-1 is a simplified cross-sectional diagram of an example step-index optical fiber with a circular core;

FIG. 4-2 is a simplified cross-sectional diagram of an example step-index optical fiber with a square core;

FIG. 4-3 is a simplified cross-sectional diagram of an example step-index optical fiber with a rectangular core;

FIG. 6-1 is a schematic showing a second set of example paths of light rays in a multi-focal confocal subsystem coupled to a multimode fiber; and FIG. 6-2 is a schematic showing a third set of example paths of light rays in a multi-focal confocal subsystem coupled to a multimode fiber.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

An "illumination aperture", as used herein, refers to any illumination aperture that is suitable for use in confocal microscopy, as would be apparent to someone skilled in the art. For example, an "illumination aperture array" refers to a plurality of pinholes, a plurality of slits, a Nipkow array, or any other suitable plurality of illumination apertures. Any suitable plurality of illumination apertures can be substituted in the examples described below for the pinhole array of pinholes employed in the examples.

A "segmented focusing array of focusing elements", as used herein, refers to any plurality of optical elements that can be used to focus light onto corresponding illumination apertures of an illumination aperture array. The optical elements may be microlenses, micromirrors, or any other focusing elements, including reflective focusing elements and diffractive focusing elements, as would be apparent to someone skilled in the art. Any segmented focusing array of focusing elements can be substituted in the examples described below for the microlens array of microlenses employed in the examples.

The terms "light" and "radiation" may be used interchangeably and refer to radiation in the UV-visible-NIR (ultraviolet-visible-near infrared) spectral range. The term "radiation source" may refer to any source able to generate and emit radiation, including but not limited to, light emitting diodes (LEDs), solid state devices, super luminescent diodes (SLDs), arc lamps, or any other suitable radiation sources as would be apparent to someone skilled in the art.

As used herein, a "microscope" comprises at least an objective. A "microscope system" is a system that may be used to probe a sample by projecting light or radiation onto the sample, thus producing reflected light or scattered light or fluorescence light or any combination thereof from the sample. As used herein, "multiplexed confocal microscopy" refers to the use of a plurality of illumination apertures to apply the confocal technique in parallel to a microscope. As used herein, "multi-focal confocal microscopy" refers to the use of a segmented focusing array of focusing elements in multiplexed confocal microscopy.

Figure 2:
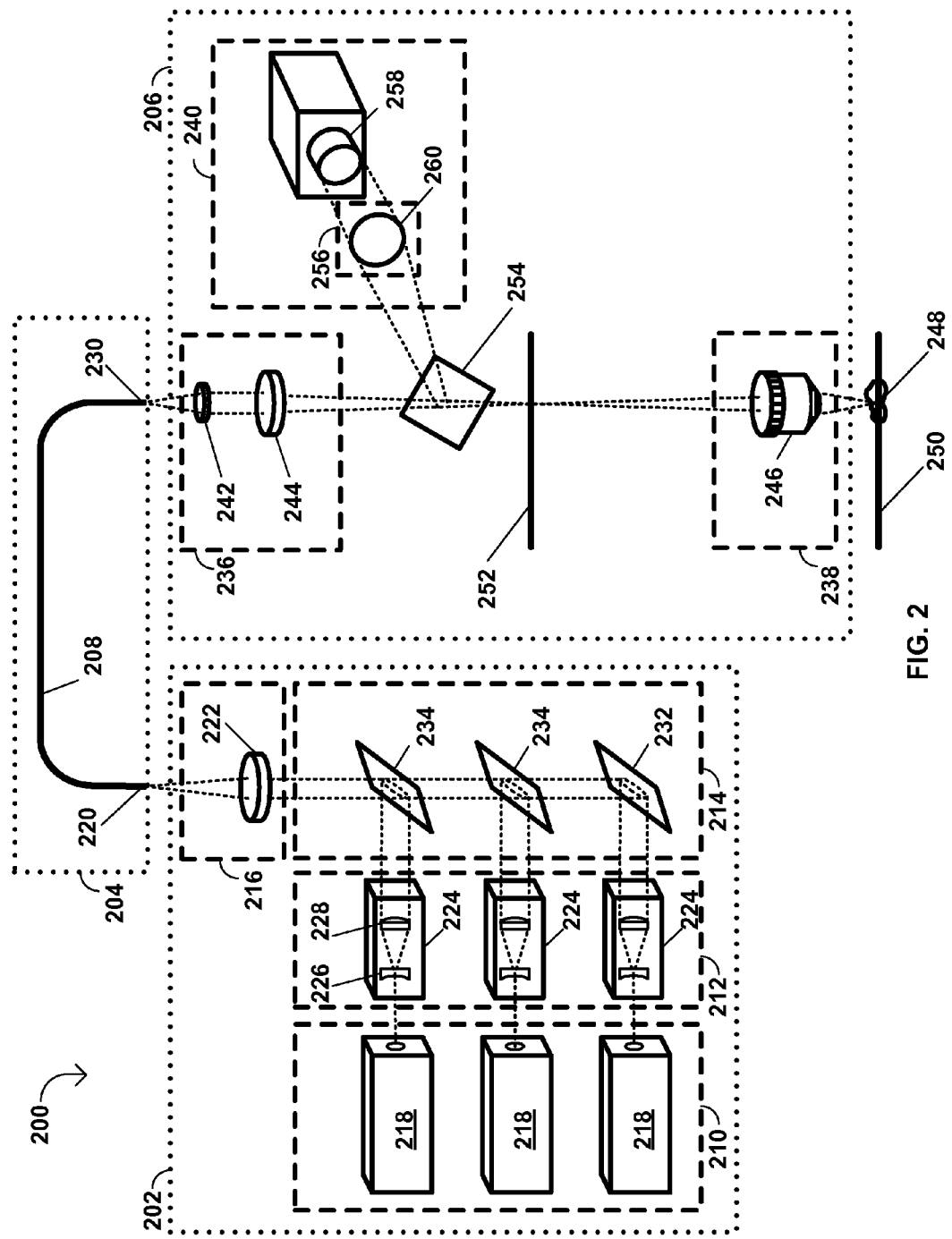
FIG. 2 is a simplified block diagram showing an example microscope system.

FIG. 2 illustrates an example of an optical microscope system 200 comprising a radiation source module 202, a radiation delivery module 204 and a microscope module 206.

The radiation source module 202 generates and optionally conditions radiation for acceptance into a multimode fiber 208 of the radiation delivery module 204. The example radiation source module 202 comprises a radiation source 210 emitting light of one or more wavelengths, followed by a light control and conditioning unit 212, a light combining unit 214 and a light-coupling unit 216.

The radiation source 210 may comprise one or more individual radiation sources 218. The radiation sources 218 are provided with one or more power supplies (not shown) and may generate radiation of one or more wavelengths. An example implementation of an optical microscope system uses lasers as the radiation sources 218 but other implementations could use any radiation sources emitting light that can be coupled to the multimode fiber 208.

Optics of the light control and conditioning unit 212 are designed to provide the radiation beam being guided into an incident end 220 of the multimode optical fiber 208 by a lens 222 with a circular cross section of a predetermined diameter. The light control and conditioning unit 212 may comprise one or more light control and conditioning subunits 224, each of the light control and conditioning subunits 224 corresponding to one of the individual radiation sources 218. For the sake of simplicity, each of the light control and conditioning subunits 224 is shown schematically as a simple Galilean telescopic beam expander that is built from a negative lens 226 and a positive lens 228. Alternative implementations of the light control and conditioning subunits 224 may comprise anamorphic prismatic or cylindrical optics to provide an elliptical laser beam with the circular property and/or beam-shaping means to make adjustments enabling the light intensity distribution to be more uniform (such as the means disclosed in U.S. Pat. No. 7,592,582 for converting a beam of light outgoing from a distal end of an optical fiber into a collimated beam with a predetermined intensity distribution, for example). The light control and conditioning subunits 224 may comprise additional beam shaping means to enable the light intensity distribution to be more uniform or to get a predetermined intensity profile at a distal end 230 of the multimode fiber 208. Such additional beam shaping means will be known to someone skilled in the art.

The light control and conditioning subunits 224 may optionally comprise means for control of individual radiation source power and/or wavelength to optimize micro-imaging conditions (not shown). For example, in the case that one of the individual radiation sources 218 is a laser, the corresponding one of the light control and conditioning subunits 224 may comprise an acousto-optic tunable filter (AOTF), or alternatively a mechanical shutter followed by a continuously variable neutral density filter wheel. The use of additional light control means will be known to someone skilled in the art.

The light combining unit 214 comprises optical elements that combine collimated beams of different wavelengths from the light control and conditioning unit 212 and direct them to the light-coupling unit 216. The light combining unit 214 may comprise optics of any form, and may include, for example, one or more folding mirrors 232, dichroic mirrors 234, and any other suitable optical elements, as would be apparent to someone skilled in the art.

The light-coupling unit 216 may comprise a lens 222 designed to focus the multi-wavelength collimated beam of a predetermined diameter onto the incident end 220 of the multimode optical fiber 208. The lens 222 may have a short focal length, and may be a collimator lens, a condenser lens, a micro-objective, or some other suitable lens as would be apparent to someone skilled in the art. The cross-sectional diameter of the multi-wavelength collimated beam and the focal length of the lens 222 may be selected or designed to obtain a specific numerical aperture of the input focused beam that is proportional and close to a resulting numerical aperture of a beam emitted from the distal end 230 of the multimode fiber 208.

The incident end 220 and the distal end 230 of the multimode fiber 208 may be connected or connectable to an input connector and an output connector, respectively. The input and output connectors (not shown) may be of any type, for example, fixed connection (FC) type connectors, or any other suitable connectors as would be apparent to someone skilled in the art.

A transverse distribution of light exiting the multimode fiber 208 is substantially uniform. The core of the multimode fiber 208 may have a circular cross section, a square cross section, a rectangular cross section, or any other suitable cross section. The use of a multimode fiber having a core of square cross section or a core of rectangular cross section may have an advantage in that the illumination area of a sample to be imaged can be better matched to the shape of an image sensor of a detector. The use of a multimode fiber having a core of circular cross section may have an advantage of being less expensive due to its greater availability. Examples of multimode fibers will be described in greater detail with respect to FIG. 4.

For example, the multimode fiber 208 is a step-index fiber. A step-index fiber has a constant refractive index in its core and a step to a lower refractive index at the core-cladding interface. Many types of step-index fibers may produce a substantially uniform transverse intensity distribution of light exiting the distal end 230 of the multimode fiber 208. The quality of the light uniformity is related to the material used in the core and cladding and to the manufacturing process.

The radiation delivery module 204 may comprise additional elements not shown in FIG. 2. For example, the radiation delivery module may comprise means for phase randomization or additional optical fibers or both. Some examples of these elements will be described in greater detail with respect to FIG. 3.

The microscope module 206 comprises a light-coupling unit 236, light-splitting optics 254, a microscope 238, and a light-detecting unit 240.

The light-coupling unit 236 is shown in FIG. 2 to comprise a lens 242 and a lens 244, but may also comprise various other optical elements (not shown). A non-exhaustive list of examples of alternative or additional elements comprised in the light-coupling unit 236 includes a single lens, multiple lenses, mirrors, multiple mirrors or any combination of suitable optical elements.

The microscope 238 comprises an objective 246 focusing light received from the light-coupling unit 236 onto a sample 248 at a sample plane 250. Any suitable objective 246 may be used as would be apparent to someone skilled in the art. The microscope 238 may also comprise additional elements (not shown), as would be apparent to someone skilled in the art.

The light splitting optics 254 are designed to pass exciting radiation received from the light-coupling unit 236 to the sample 248 via the objective 246 of the microscope 238, and to reflect return light from the sample 248 to the light-detecting unit 240. The return light is often produced by fluorescence but can result from reflection, Raman scattering or any other elastic or inelastic light scattering effect as would be known to someone skilled in the art.

A non-exhaustive list of examples of the light splitting optics 254 includes a dichroic mirror, a splitter based on polarization, a mirror with a partially reflective surface, or any other device to divide the excitation light from the return light as would be apparent to someone skilled in the art.

The light-detecting unit 240 comprises light-detecting optics 256 and a detector 258, such as a high-sensitivity imaging camera. The light-detecting optics 256 may comprise a relay lens 260, and may comprise additional elements (not shown), such as a blocking filter and/or narrow band filters for multi-spectral imaging. A non-exhaustive list of examples of the detector 258 includes a charge-coupled device (CCD) camera, a complementary metal-oxide semiconductor (CMOS) camera, an intensified CCD (ICCD) camera, and any other suitable camera as would be apparent to someone skilled in the art. A 3CCD camera with additional narrowband filters may be applied for simultaneous multi-spectral imaging.

The sample 248 and the detector 258 may be arranged such that the sample plane 250 and a plane of an image sensor of the detector 258, also known as the image sensor plane (not shown), are optically conjugate with each other in order to provide an image of the sample 248. The portion of the image sensor plane that may be activated by light received from anywhere within a field of view of the microscope is known as the active region of the detector 258.

The light-coupling unit 236 is configured to image the distal end 230 of the multimode fiber 208 onto the sample plane 250 or onto a plane 252 that is optically conjugate to the sample plane 250. Alternatively, the light-coupling unit 236 is configured to image the distal end 230 of the multimode fiber 208 sufficiently close to the sample plane 250 or sufficiently close to the conjugate plane 252 such that a radiant intensity of light at the sample plane 250 or the conjugate plane 252 is substantially uniform. Such configuration of the light-coupling unit 236 may result in substantially uniform illumination of the sample 248.

The light-coupling unit 236 may be configured to provide a magnification such that the area of substantially uniform illumination on the sample plane 250 is not substantially bigger than an imaged area of the sample plane that is imaged by any active region of the detector 258. This may improve the efficiency of the illumination.

Figure 3:
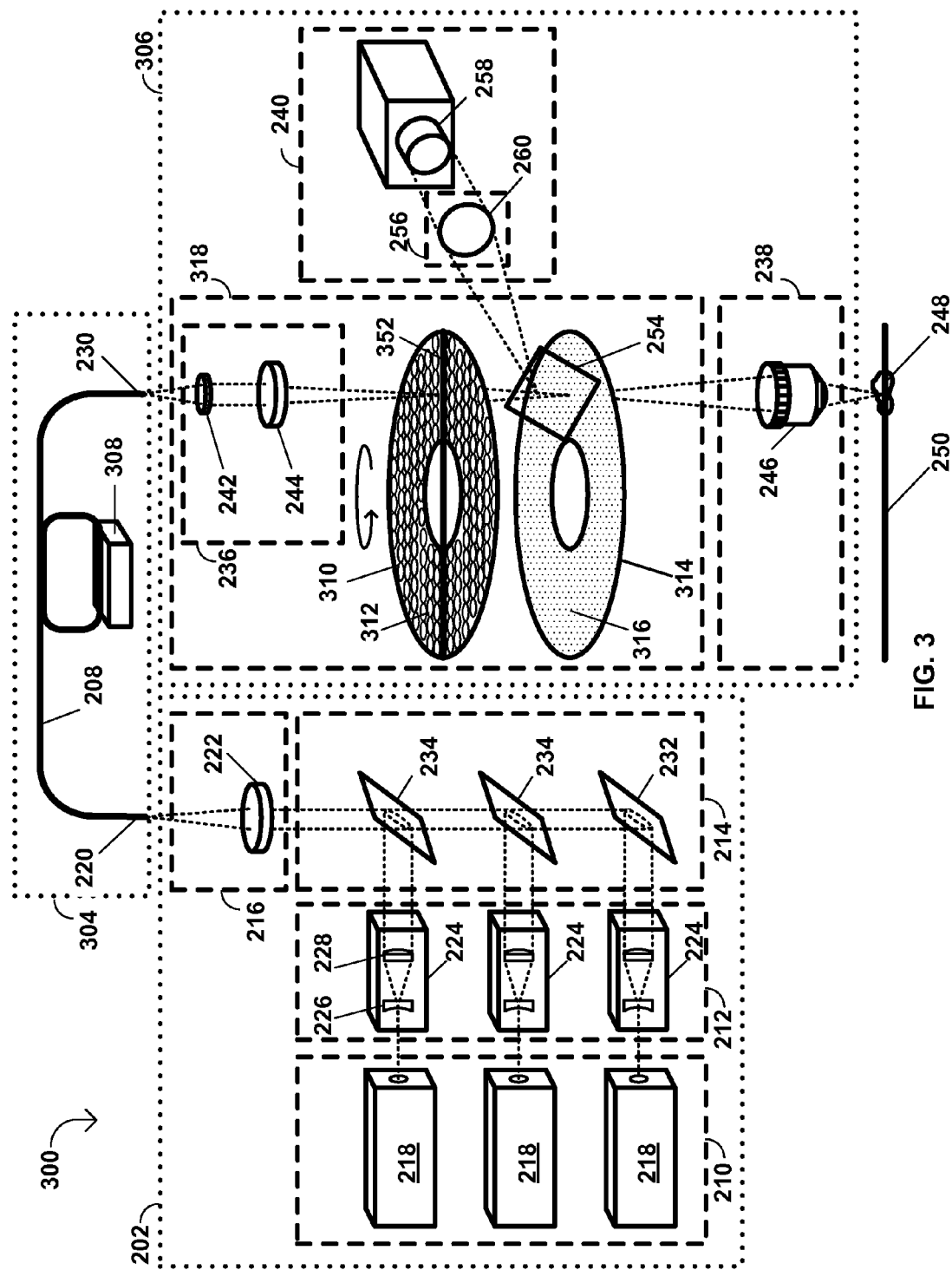
FIG. 3 is a simplified block diagram showing an example multi-focal confocal microscope system.

FIG. 3 illustrates an example of a multi-focal confocal microscope system 300 comprising the radiation source module 202, a radiation delivery module 304 and a microscope module 306.

As discussed with respect to FIG. 2, the radiation delivery module 204 may comprise additional elements beyond the multimode fiber 208. In the case that the radiation source 210 generates coherent radiation, for example, if one or more of the individual radiation sources 218 is a laser, the radiation delivery module 204 may further comprise a phase randomizer. A phase randomizer is designed to suppress speckle that is present due to temporal coherence properties of coherent radiation.

The radiation delivery module 304 shown in FIG. 3 comprises a phase randomizer in the form of a vibrating mechanical driver 308 designed to generate vibrations in a section of the multimode fiber 208. The vibrating mechanical driver 308 may be mechanically coupled to the section of the multimode fiber 208, for example, by being attached to a portion of the multimode fiber 208 that is coiled and loosely held by retaining clamps, allowing a long length of the multimode fiber 208 to be vibrated. The vibrations induced by the vibrating mechanical driver 308 may result in fast variations of the optical path lengths of individual rays in the multimode fiber 208, randomizing the coherence effects of the light, and as a result, suppressing spatial modulation of the amplitude of image of the sample (speckle). The vibrating mechanical driver 308 may be built in accordance with Ellis et al. (*J. Cell Biol.* 83:303a, 1979) and/or may include a piezoelectric driver, or any electromechanical setup able to generate suitable vibrations as would be apparent to someone skilled in the art. For example, the vibrating mechanical driver 308 may be built in the form of an electromotor with an unbalanced weight fixed on its shaft or a linear voice coil motor.

Although not explicitly shown, a phase randomizer may alternatively or additionally comprise a rotating diffuser placed in proximity to the incident end 220 of the multimode fiber 208 or to the distal end 230 of the multimode fiber 208. The rotating diffuser could also be placed at a conjugate image plane of the distal end 230 of the multimode fiber 208 or at a conjugate image plane of the incident end 220 of the multimode fiber 208. The rotating diffuser may comprise a high-speed electromotor to rotate the diffuser.

To avoid high optical power losses when using a rotating diffuser, the distance $z_d$ travelled by the light from the rotating diffuser to the incident end 220 of the multimode fiber 208, or the distance $z_d$ travelled by the light from the distal end 230 of the multimode fiber 208 to the rotating diffuser should satisfy Eqn. 3:

$$z_d < \frac{D_F}{\theta_d}, \qquad (3)$$

where $D_F$ is the core diameter of the fiber (in the case of a fiber having a circular cross section) and $\theta_d$ is a FWHM (full width at half maximum) of the angular light distribution of the rotating diffuser.

Although not explicitly shown, it is further contemplated that the radiation delivery module 304 may comprise one or more optical fibers in addition to the multimode fiber 208. The additional optical fibers may be multimode fibers or single mode fibers and may have input and output connectors of any type, for example, FC type connectors, or any other suitable connectors as would be apparent to someone skilled in the art. The additional optical fibers may be used in conjunction with the multimode fiber 208 to deliver radiation from the radiation source module 202 to the microscope module 306. For example, an additional optical fiber may receive radiation from the radiation source module 202, which it then transmits to the multimode fiber 208 via a rotating diffuser of a phase randomizer. In this case, the phase randomizer is designed to randomize the phase of coherent radiation as the radiation is transmitted from the optical fiber to the multimode fiber 208. In another example, a vibrating mechanical driver 308 may be used to randomize the phase of light delivered to the microscope module 306 by inducing vibrations in a section of the multimode fiber 208 or in a section of an additional optical fiber.

Other types of speckle reduction may be employed as alternatives or in addition to the fiber disturbance through a vibrating mechanical driver or a rotating diffuser. One such example is the movement or vibration of a tip of the multimode fiber 208.

To achieve the multi-focal confocal effect, the microscope module 306 has a microlens array disk 310 comprising a plurality of individual microlenses 312, and a pinhole array disk 314 comprising a plurality of pinholes 316. The light-coupling unit 236, the microlens array disk 310, the light splitting optics 254, and the pinhole array disk 314 together form a multi-focal confocal subsystem 318.

The pinhole array disk 314 is mounted on a same axis of the microlens array disk 310 at a distance from the microlens array disk 310 that is substantially equal to a focal length of the microlenses 312, in such a way that each microlens 312 focuses its light onto a different individual pinhole 316 comprised in the pinhole array disk 314. The pinhole array disk 314 is co-rotated with the microlens array disk 310 at a constant speed.

In order to provide a confocal image of the sample 248, the pinhole array disk 314, the sample 248, and the detector 258 may be arranged such that a plane 352 of the pinhole array disk 314, the sample plane 250, and the image sensor plane (not shown) are optically conjugate with each other.

As discussed with respect to FIG. 2, a transverse distribution of light exiting the multimode fiber 208 is substantially uniform. The core of the multimode fiber 208 may have a circular cross section, a square cross section, a rectangular cross section, or any other suitable cross section. The use of a multimode fiber having a core of square cross section or a core of rectangular cross section may have an advantage in that the illumination area of a sample to be imaged can be better matched to the shape of an image sensor of a detector. The use of a multimode fiber having a core of circular cross section may have an advantage of being less expensive due to its greater availability. Examples of multimode fibers will be described in greater detail with respect to FIG. 4.

For example, the multimode fiber 208 is a step-index fiber. A step-index fiber has a constant refractive index in its core and a step to a lower refractive index at the core-cladding interface. Many types of step-index fibers may produce a substantially uniform transverse intensity distribution of light exiting the distal end 230 of the multimode fiber 208. The quality of the light uniformity is related to the material used in the core and cladding and to the manufacturing process.

The light-coupling unit 236 is configured to image the distal end 230 of the multimode fiber 208 onto the microlens array plane 352. Alternatively, the light-coupling unit 236 is configured to image the distal end 230 of the multimode fiber 208 sufficiently close to the microlens array plane 352 such that a radiant intensity of light at the microlens array plane 352 is substantially uniform. Such configuration of the light-coupling unit 236 may result in substantially uniform illumination of the sample 248 after a complete scan of the pinholes.

The light-coupling unit 236 may be configured to provide a magnification that is large enough such that the size of the image of the distal end 230 of the multimode fiber 208 at the microlens array plane 352 is sufficient to illuminate with substantial uniformity all the pinholes 316 that are used by the detector 258 to construct the confocal image of the sample 248. The light-coupling unit 236 may be further configured to provide a magnification such that the area of substantially uniform illumination at or near the sample plane 250 after a complete scan of the pinholes is not substantially bigger than an imaged area of the sample plane that is imaged by any active region of the detector 258. This further configuration of the light-coupling unit 236 may improve the efficiency of the illumination. An example of a suitable configuration of optical elements for substantially uniform and efficient illumination is described with respect to FIGS. 5 and 6.

FIGS. 4-1, 4-2, and 4-3 illustrate cross-sectional diagrams of example step-index optical fibers, together with a corresponding plot of refractive index as a function of position along a diameter of the fiber.

Figure 1:
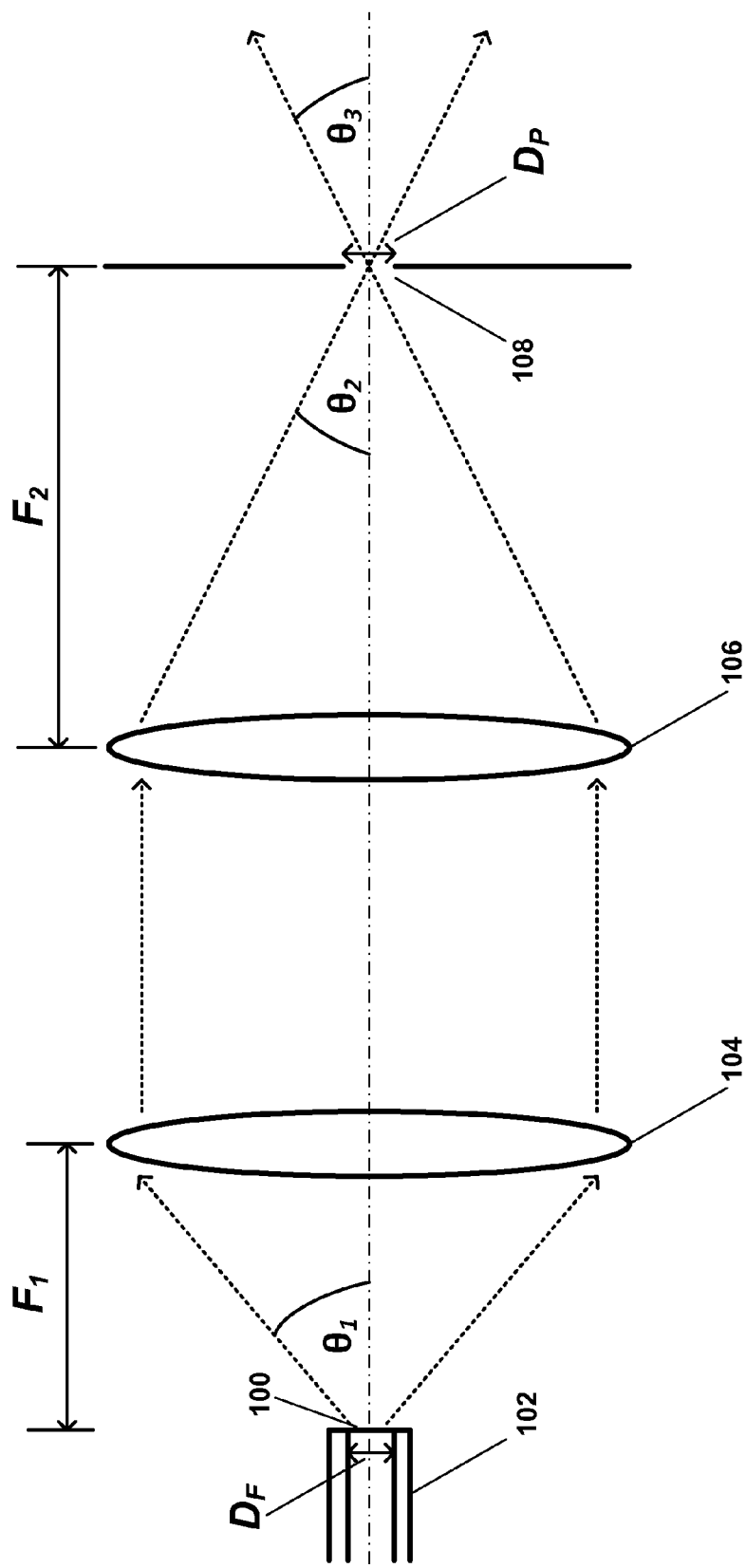
FIG. 1 is a schematic showing an example set of optics to couple an optical fiber to a single pinhole as in a point scanning confocal microscope, as known in the art.
Figures 1, 2, 3, 4:
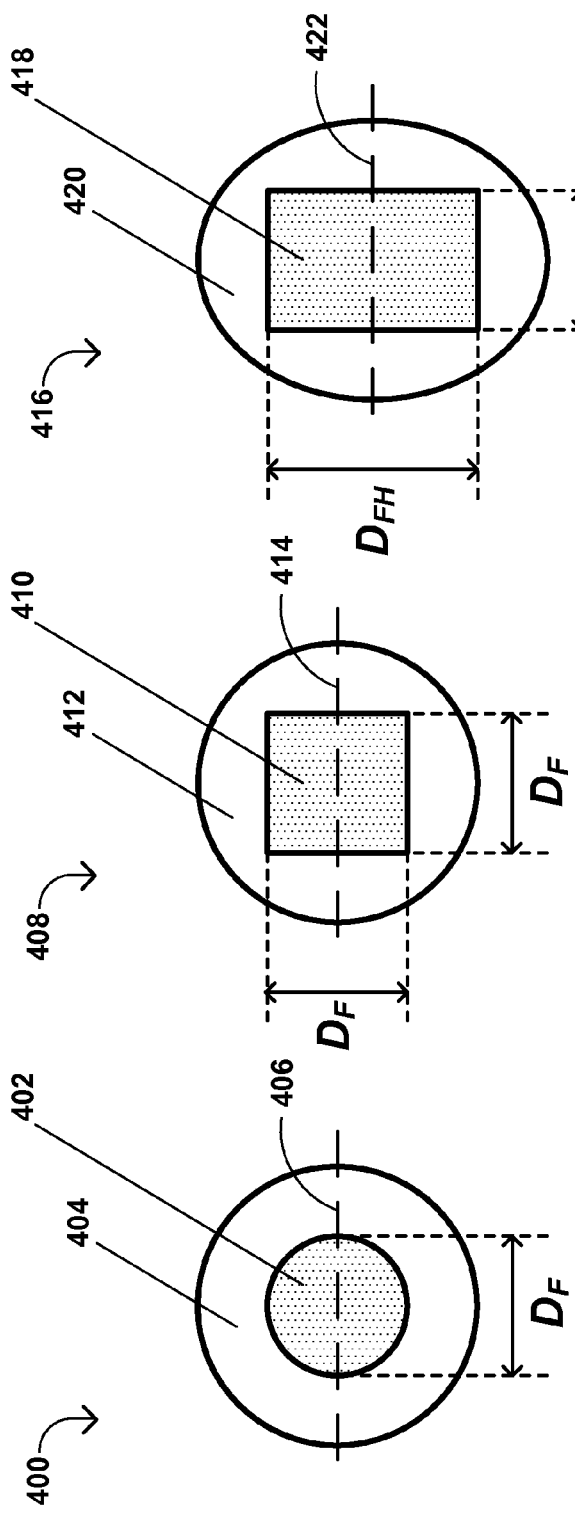

FIG. 4-1 illustrates a cross section of an optical fiber 400 having a core 402 of circular cross section of diameter $D_F$ and a cladding 404 surrounding the core 402. The cladding 404 may have a circular outer cross section as shown, or any other suitable cross section. The cladding 404 has a refractive index $n_1$ and the core 402 has a refractive index $n_2$, where the refractive index $n_1$ is less than the refractive index $n_2$, that is $n_1<n_2$. The plot of refractive index of the optical fiber 400 is shown below the optical fiber 400 as a function of position along a dashed line 406, assuming the optical fiber 400 is surrounded by air (refractive index n=1). It is also contemplated that the cladding 404 has a non-uniform refractive index, as long as the refractive index at the boundary of the core 402 and the cladding 404 changes abruptly from $n_2$ to $n_1$.

FIG. 4-2 illustrates a cross section of an optical fiber 408 having a core 410 of square cross section of width $D_F$ and height $D_F$ and a cladding 412 surrounding the core 410. The cladding 412 may have a circular outer cross section as shown, or it may have any other suitable cross section. The cladding 412 has a refractive index $n_1$ and the core 410 has a refractive index $n_2$, where the refractive index $n_1$ is less than the refractive index $n_2$, that is $n_1<n_2$. The plot of refractive index of the optical fiber 408 is shown below the optical fiber 408 as a function of position along a dashed line 414, assuming the optical fiber 408 is surrounded by air (refractive index n=1). It is also contemplated that the cladding 412 has a non-uniform refractive index, as long as the refractive index at the boundary of the core 410 and the cladding 412 changes abruptly from $n_2$ to $n_1$.

FIG. 4-3 illustrates a cross section of an optical fiber 416 having a core 418 of rectangular cross section with a width $D_{FW}$ and height $D_{FH}$ and a cladding 420 surrounding the rectangular core 418. The cladding 420 may also have an elliptical outer cross section as shown, or it may have any other suitable cross section. The cladding 420 has a refractive index $n_1$ and the rectangular core 418 has a refractive index $n_2$, where the refractive index $n_1$ is less than the refractive index $n_2$, that is $n_1<n_2$. The plot of refractive index of the optical fiber 416 is shown below the optical fiber 416 as a function of position along a dashed line 422, assuming the optical fiber 416 is surrounded by air (refractive index n=1). It is also contemplated that the cladding 420 has a non-uniform refractive index, as long as the refractive index at the boundary of the core 418 and the cladding 420 changes abruptly from $n_2$ to $n_1$.

The numerical aperture $NA_F$ of an optical fiber is related to the difference between the refractive index $n_1$ of the cladding and the refractive index $n_2$ of the core. A particular step-index multimode fiber might have a cladding of refractive index $n_1=1.46$ and a core of refractive index $n_2=1.48$, with both the core and the cladding made of a silica composition. In terms of dimensions, the core might have a circular cross section of diameter $D_F=200$ µm, and the length of the multimode fiber might be 2 meters. It should be noted that these properties are merely examples, and many other step-index multimode fibers are possible.

Example optics, configured to image a distal end of a multimode fiber onto a microlens array of a multi-focal confocal subsystem, will now be described with respect to FIGS. 5, 6-1 and 6-2. Where a transverse distribution of light exiting the distal end of the multimode fiber is substantially uniform, such configuration of the optics may produce a substantially uniform radiant intensity on the microlenses of the microlens array, thus making it possible to achieve a substantially uniform intensity of light transmitted through corresponding pinholes of a pinhole array, which, after a complete scan of the pinholes, may result in substantially uniform illumination of a sample to be probed by a microscope. Furthermore, as explained in detail below, by selecting an appropriate step-index multimode fiber and light-coupling unit, it may be possible to achieve efficient transmission of light emitted from the distal end of the multimode fiber through the pinholes.

Figure 5:
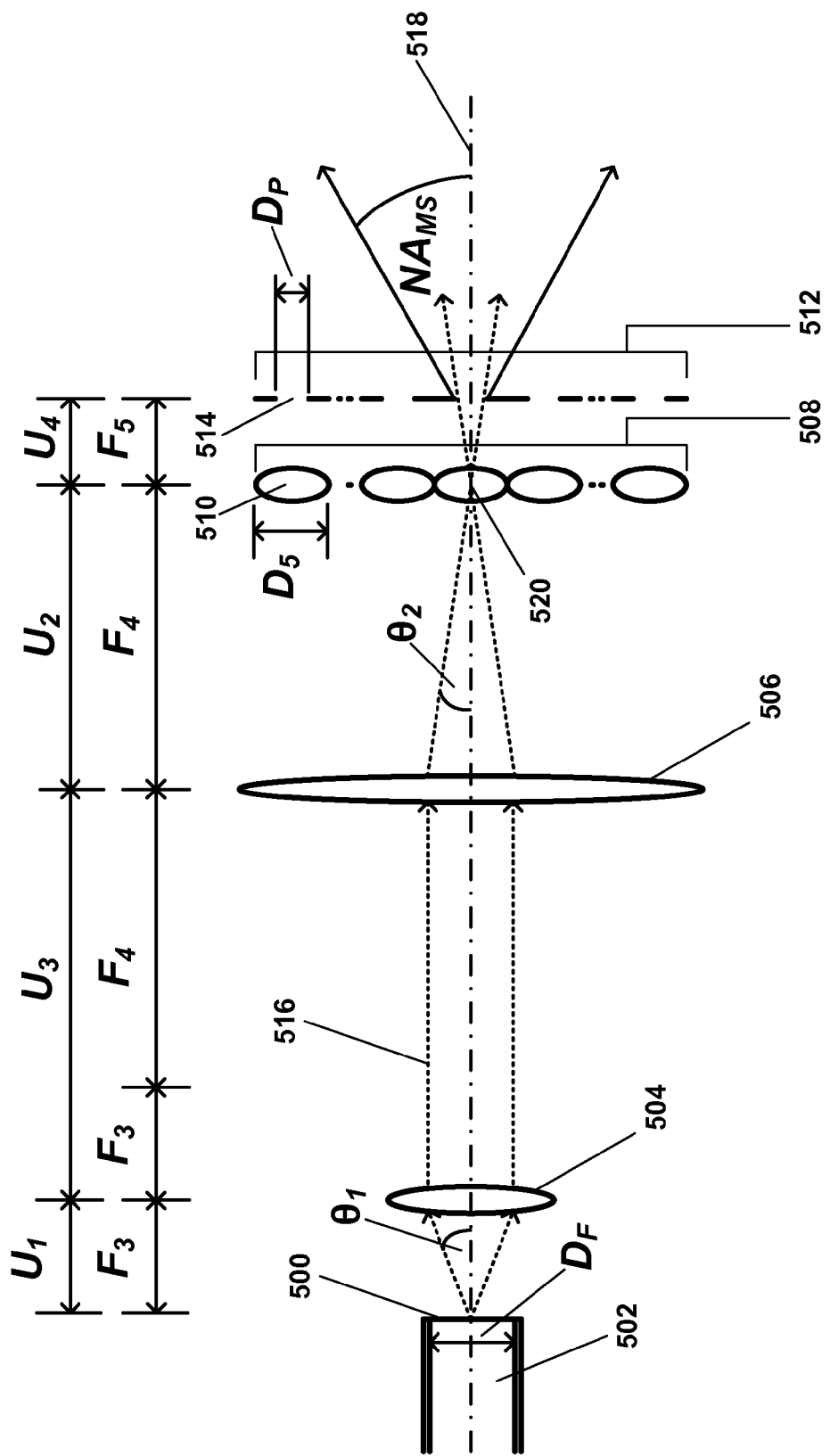
FIG. 5 is a schematic showing a first set of example paths of light rays in a multi-focal confocal subsystem coupled to a multimode fiber.

FIG. 5 illustrates example optics projecting light from a distal end 500 of a multimode fiber 502 through lenses 504 and 506 and onto a microlens array 508. The microlens array 508 comprises a plurality of individual microlenses 510 which focus the light from the distal end 500 onto a pinhole array 512 comprising a plurality of individual pinholes 514. The multimode fiber 502 is an example of the multimode fiber 208 illustrated in FIGS. 2 and 3, and therefore a transverse distribution of light exiting the distal end of the multimode fiber 502 is substantially uniform. The microlens array 508 and the pinhole array 512 are examples of the microlens array disk 310 and the pinhole array disk 314, respectively, illustrated in FIG. 3. In this example, the multimode fiber 502 is a step-index multimode fiber with a numerical aperture $NA_F$ and has a core of either circular cross section, square cross section, or rectangular cross section.

Lenses 504 and 506 are example optical elements that may be comprised in the light-coupling unit 236 described with respect to FIG. 3. The lenses 504 and 506 are positive focal length achromatic doublets with focal lengths $F_3$ and $F_4$, respectively. This type of lens may be desirable for its inexpensiveness and ability to handle aberrations. However, the use of alternative and/or additional optical elements in the light-coupling unit 236 is contemplated.

The distal end 500 of the multimode fiber 502 is placed a distance $U_1$ from the lens 504, and the microlens array 508 is placed a distance $U_2$ from the lens 506. The lenses 504 and 506 are separated by a distance $U_3$ equal to a sum of their focal lengths $F_3$ and $F_4$, that is $U_3=F_3+F_4$, thereby forming an optical relay. The microlens array 508 and the pinhole array 512 are separated by distance $U_4$ substantially equal to a focal length $F_5$ of the microlenses 510, that is $U_4=F_5$, so that light focused by the microlenses 510 is focused on the pinhole array 512.

Using the thin lens approximation, the lens system of the lens 504 and the lens 506 images the distal end 500 of the multimode fiber 502 with a magnification M of:

$$M = -\frac{F_3}{F_4}. \quad (4)$$

In order for the lens system of the lens 504 and the lens 506 to image the distal end 500 of the multimode fiber 502 onto the microlens array 508, and using the thin lens approximation and paraxial approximations, the distance $U_2$ between the lens 506 and the microlens array 508, is expressed by Eqn. 5 as:

$$U_2 = [F_3^2 + F_3 F_4 - U_1 F_4]\frac{F_4}{F_3^2}. \quad (5)$$

where Eqn. 5 takes into account the distance $U_3 = F_3 + F_4$ between the lens 504 and the lens 506.

In the typical case where the distal end 500 of the multimode fiber 502 is positioned such that the distance $U_1$ between the distal end 500 of the multimode fiber 502 and the lens 504 is substantially equal to the focal length $F_3$ of the lens 504, that is $U_1 = F_3$, the distance $U_2$ between the lens 506 and the microlens array 508 determined by Eqn. 5 is equal to the focal length $F_4$ of the lens 506, that is $U_2 = F_4$. Small adjustments may be made to the distance $U_1$ to allow greater flexibility in positioning the image of the distal end 500 of the multimode fiber 502 on the microlens array 508. Eqn. 5 is valid in the thin lens and paraxial approximations for optical systems. Adjustments that may be needed for small deviations from these approximations are obvious to those skilled in the art.

Using the paraxial ray approximation, a light ray 516 originating from the center of the distal end 500 of the multimode fiber 502 at an angle $\theta_1$ relative to an optical axis 518 of the multimode fiber 502 will go through the center of a central microlens 520 at an angle $\theta_2$ relative to the optical axis 518, where the angle $\theta_2$ is expressed as:

$$\theta_2 \cong \frac{\theta_1}{|M|}. \quad (6)$$

The light ray 516 will then pass through a corresponding one of the pinholes 514 at a distance from the center of the pinhole 514 equal to a product of the focal length $F_5$ of the microlenses 510 and the angle $\theta_2$, that is $F_5\theta_2$. In order for light to pass efficiently from the point center of the distal end 500 of the multimode fiber 502 through the pinhole 514 corresponding to the central microlens 520, this system of the multimode fiber 502, the lens 504, the lens 506, the microlens array 508 and the pinhole array 512 should meet the requirement expressed by Eqn. 7:

$$D_P \geq 2F_5\theta_2 \cong \frac{2F_5\theta_1}{|M|}. \quad (7)$$

The diameter $D_5$ and the focal length $F_5$ of the microlenses 510 are typically designed in a multi-focal confocal subsystem to produce exit light from the pinhole 514 that is at or near the designed acceptance numerical aperture $NA_{MS}$ of a microscope when the microlenses 510 are illuminated with collimated light. The approximate relationship between the diameter $D_5$ and the focal length $F_5$ of the microlenses 510 is then:

$$2F_5 NA_{MS} \cong 2D_5. \quad (8)$$

In practice, the relationship of Eqn. 8 may be somewhat different due to generalization of the multi-focal confocal subsystem to work with a variety of microscopes and objectives. For instance, the numerical aperture of the microlenses 510 may not match the numerical aperture $NA_{MS}$.

FIGS. 6-1 and 6-2 illustrate the paths of light rays in the example of FIG. 5 that are imaged to one of the microlenses 510 at a distance from the optical axis 518. The distance is approximately equal to a product of the number of microlenses between the microlens being considered and the optical axis, and the diameter of each microlens 510. This distance is not exact, as the microlenses 510 are typically arranged in a Nipkow array when viewed in a two dimensional plane, however this approximation is sufficient for the discussion that follows.

FIG. 6-1 illustrates the light rays from the multimode fiber 502 that are imaged to a center of the Nth microlens 602 in the microlens array 508. FIG. 6-2 illustrates light rays that pass through an edge of the Nth microlens 602 in the microlens array 508.

Light rays parallel to the optical axis 518, for example rays 604 and 606, will remain parallel to the optical axis after passing through the lens 506 as long as the lens 504 and the lens 506 are separated by a distance $U_3$ equal to a sum of their focal lengths, that is $U_3 = F_3 + F_4$. This is true regardless of the distance $U_1$ between the distal end 500 of the multimode fiber 502 and the lens 504. Any ray parallel to the optical axis 518 will be focused to the center of the pinhole behind the microlens through which the ray passes, as is shown by rays 604 and 606, if the centers of the pinholes are aligned with the centers of the microlenses.

A point 608 on the distal end 500 of the multimode fiber 502 is imaged to the center of the Nth microlens 602 from the optical axis 518, where the center is a distance $D_{i1}$ from the optical axis 518 equal to a product of N and a diameter $D_5$ of the microlenses 510, that is $D_{i1} = N*D_5$. If the point 608 is at a distance $D_{s1}$ from the optical axis 518, then the relationship between the distance $D_{i1}$ and the distance $D_{s1}$ is expressed as:

$$D_{i1} \cong |M|D_{s1} \cong ND_5. \quad (9)$$

As described above with respect to the light ray 516 and Eqn. 6, a light ray 610 originating from the point 608 at an angle $\theta_1$ relative to the optical axis 518 will go through the center of the Nth microlens 602 at an angle $\theta_2 \cong \theta_1/|M|$. The light ray 610 will then pass through the pinhole that corresponds to the Nth microlens 602, at a distance $F_5\theta_2$ from the center of that pinhole. The relation of Eqn. 7 still holds for the light to efficiently pass through the pinhole that corresponds to the Nth microlens 602 from the point 608.

As illustrated in FIG. 6-2, a point 612 on the distal end 500 of the multimode fiber 502 is imaged to the edge of the Nth microlens 602 in the microlens array 508, and the edge is a distance $D_{i2}$ from the optical axis 518, where $D_{i2}$ is equal to $(N+\frac{1}{2})*D_5$. If the point 612 is at a distance $D_{s2}$ from the optical axis 518, then the relationship between the distance $D_{i2}$ and the distance $D_{s2}$ is expressed as:

$$D_{i2} \cong |M|D_{s2} \cong (N+\frac{1}{2})D_5. \quad (10)$$

The angle $\theta_2$ relative to the optical axis 518 of a ray 614 going into the Nth microlens 602 is still given by Eqn. 6 and the relation of Eqn. 7 still holds for the light to efficiently pass through the pinhole that corresponds to the Nth microlens 602 from the point 612.

The magnification M provided by the system of lenses 504 and 506 may be chosen so that the dimensions $D_x$ and $D_y$ of the image of the distal end 500 of the multimode fiber 502 on the microlens array 508 are large enough to illuminate all the pinholes 514 that are used to construct the confocal image. If there is a total of $N_t$ microlenses 510 that form the image in the vertical axis and the image is assumed to have an aspect ratio such that the microlens array 508 is scanned to image $N_t$ points in the horizontal axis, then the dimensions of the area to be illuminated on the microlens array are approximately $D_x = N_t D_5$ and $D_y = N_t D_5$. In the case that the multimode fiber 502 has a core of circular cross section, the minimum magnification $M_{min}$ can be written approximately as:

$$M_{min} \cong \sqrt{2}\,\frac{N_t D_5}{D_F}. \tag{11}$$

The square root of 2 factor is needed so that the entire image diagonal is filled. If the multimode fiber 502 has a core of square cross section of dimension $D_F$, the minimum magnification $M_{min}$ is written approximately as:

$$M_{min} \cong \frac{N_t D_5}{D_F}. \tag{12}$$

If the multimode fiber 502 has a core of rectangular cross section with dimensions height $D_{FH}$ and width $D_{FW}$, the minimum magnification $M_{min}$ is written approximately as:

$$M_{min} \cong \max\!\left(\frac{N_t D_5}{D_{FW}},\,\frac{N_t D_5}{D_{FH}}\right). \tag{13}$$

If the multimode fiber 502 has a core of circular cross section, Eqns. 7, 8 and 11 may be used with the paraxial approximation to derive the following relationship between the product of the core diameter $D_F$ of the multimode fiber 502 and the exit angle $\theta_1$:

$$D_F \theta_1 \leq \sqrt{2}\,N_t D_P \mathrm{NA}_{MS}. \tag{14}$$

If the multimode fiber 502 has a core of square cross section, Eqns. 7, 8, and 12 may be used with the paraxial approximation to derive an analogous relationship to that of Eqn. 14. In this case, the square root of two factor is not present, such that:

$$D_F \theta_1 \leq N_t D_P \mathrm{NA}_{MS}. \tag{15}$$

In the case that the core of the multimode fiber 502 has a rectangular cross section, the square dimension $D_F$ in Eqn. 15 is replaced by the rectangular height $D_{FH}$ or rectangular width $D_{FW}$ that gives the largest value of $N_t/D_{FW}$ or $N_t/D_{FH}$.

Assuming light from the multimode fiber 502 exits into air (refractive index $n=1$), according to Eqn. 1, the numerical aperture $\mathrm{NA}_F$ is related to the exit angle $\theta_1$ of the multimode fiber 502 by $\mathrm{NA}_F = \sin(\theta_1)$. For small angles $\theta_1$, $\sin(\theta_1)$ is approximately equal to $\theta_1$, that is $\sin(\theta_1) \cong \theta_1$. Therefore, the numerical aperture $\mathrm{NA}_F$ of the fiber is approximately equal to the angle $\theta_1$, that is $\mathrm{NA}_F \cong \theta_1$. Therefore, for the case in which the multimode fiber 502 has a core of circular cross section, the product of the core diameter $D_F$ and the numerical aperture $\mathrm{NA}_F$ of the multimode fiber 502 should be limited to the value on the right-hand side of Eqn. 14 in order to achieve efficient illumination of a sample. Similarly, for the case in which the multimode fiber 502 has a core of square or rectangular cross section, the product of the dimension $D_F$ (or $D_{FH}$ or $D_{FW}$) and the numerical aperture $\mathrm{NA}_F$ of the multimode fiber 502 should be limited to the value on the right-hand side of Eqn. 15 in order to achieve efficient illumination of a sample. Larger values for the product of the core dimension $D_F$ and the numerical aperture $\mathrm{NA}_F$ may be used but may result in a reduction in the transmission of light from the multimode fiber 502 through the pinholes 514 or a reduction in the light available to the detector. However, it should be noted that a multimode fiber of larger core dimensions than would be predicted by Eqn. 14 or Eqn. 15 could be used if the radiation coupled into the incident end (not shown) of the multimode fiber had an input numerical aperture of less than the numerical aperture $\mathrm{NA}_F$ of the multimode fiber. In this case, the exit angle $\theta_1$ of light emitted from the multimode fiber might be less than that determined by the numerical aperture $\mathrm{NA}_F$ of the multimode fiber, depending on the physical properties associated with the composition and configuration of the multimode fiber.

The relation given by Eqn. 14 (for a fiber having a core of circular cross section) or Eqn. 15 (for a fiber having a core of square or rectangular cross section) may be used to select an appropriate multimode fiber for efficient illumination of a sample to be probed by a multi-focal confocal microscope system. For example, given a multimode fiber 502 having a particular core diameter $D_F$, and lenses 504 and 506 that produce a particular minimum magnification $M_{min}$, the relationship of Eqn. 14 may be used to select the appropriate numerical aperture $\mathrm{NA}_F$ of the multimode fiber 502 for efficient illumination of the sample to be probed by the microscope, where the microscope has an acceptance numerical aperture $\mathrm{NA}_{MS}$, with the microlens array 508 and the pinhole array 512 configured as described with respect to FIGS. 5 and 6.

In the case of a multi-focal confocal subsystem where the pinholes 514 are centered at the focal points of the corresponding microlenses 510, improved efficiency may be achieved if the light-coupling optics are configured so that the light rays that are parallel to the optical axis 518 at the plane of the distal end 500 of the multimode fiber 502 are maintained parallel to the optical axis 518 at the image plane by the imaging optics. However, in the case of a multi-focal confocal subsystem where the pinholes 514 are offset from the focal points of their corresponding microlenses 510, improved efficiency may be achieved if the light-coupling optics are configured so that rays parallel to the optical axis 518 at the distal end 500 of the multimode fiber 502 still pass through the centers of the pinholes 514.

The relationships expressed in Eqns. 14 and 15 are related to an etendue $\Omega$ of the optical system. Etendue is a measure of the potential throughput of light in an optical system. An etendue of light emitted from a fiber can be defined to be the product of the solid angle subtended by the emission and the area of the distal end of the fiber. In a single point scanning confocal system using a single mode fiber 102, as described with respect to FIG. 1, the relationship between the core diameter $D_F$ and divergence angle $\theta_1$ from the single mode fiber 102 is fixed by diffraction theory. The size $D_P$ of the pinholes 108 is also typically chosen to be at or near the diffraction limited spot size for light converging at the acceptance numerical aperture $\mathrm{NA}_{MS}$ of the microscope. A smaller pinhole 108 will reduce the light transmission to the sample and a larger pinhole 108 will reduce the resolution. The spot sizes of the light exiting the single mode fiber 102 and the light at the pinhole 108 are both determined by diffraction theory and have the relationship:

$$D_F \theta_1 = D_P \theta_2. \tag{16}$$

An etendue of the single point scanning confocal system is proportional to the square of the left hand side of Eqn. 16, that is $(D_F\theta_1)^2$, where the square of core dimension $D_F$ is proportional to the exit mode area of the fiber and, for small exit angles $\theta_1$, the square of the exit angle $\theta_1$ is proportional to the solid angle of light exiting the fiber. An etendue of the light exiting the fiber is thus fixed by diffraction theory and the fiber is limited to being a diffraction limited source, thus requiring it to be a single mode fiber.

As in the case of the single point scanning confocal system, for a multi-focal confocal system, the square of the left hand side of Eqn. 14 or Eqn. 15, that is $(D_F\theta_1)^2$, is proportional to an etendue of light exiting the fiber. It is apparent from the squares of the right-hand sides of Eqns. 14 and 15 that, in general, when using fiber to deliver radiation in a multi-focal confocal system, the etendue of light emitted from the distal end of the fiber and imaged onto the microlens array is proportional to the total number of pinholes to be illuminated. This can be compared to a single point scanner where the etendue of the light source is fixed, as shown by Eqn. 16. The increase in etendue due to the multiple pinholes in a multi-focal confocal system with a microlens array allows for the use of a light source having a larger etendue, such as a multimode fiber, while still maintaining good light throughput through the optical system.

In a multi-focal confocal subsystem illustrated in FIGS. 5 and 6, if the focal length $F_5$ of the microlenses 510 is designed to optimally transmit light from a single mode fiber through the pinholes 514, the maximum angle of light rays passing through a particular pinhole 514 will be slightly larger if the single mode fiber is replaced with the multimode fiber 502. Therefore, the use of the multimode fiber 502 may cause some extra light loss through the microscope optics, however this increase in angle is generally small and may result in very little additional light being lost. The small size of this angle may be demonstrated by considering a light ray 616 that passes through the edge of the microlens 602 and proximal the edge of the pinhole corresponding to the microlens 602, as illustrated in FIG. 6-2. Relative to the optical axis 518, the light ray 616 has the largest angle through the pinhole. The light ray 616 passes through the pinhole at an angle of $\theta_3 = (D_5 + D_P)/(2F_5)$. As previously described with respect to Eqn. 8, the focal length $F_5$ and diameter $D_5$ of the microlenses 510 are typically designed so that collimated light incident on the microlenses 510 will converge at an angle to match the acceptance numerical aperture $NA_{MS}$ of the microscope. A rearrangement of Eqn. 8 indicates that the focal length $F_5$ and diameter $D_5$ may be designed such that a ratio of the diameter $D_5$ to the focal length $F_5$ is approximately equal to twice the acceptance numerical aperture $NA_{MS}$ of the microscope, that is $D_5/F_5 \cong 2NA_{MS}$. By design, the diameter $D_P$ of the pinhole is much smaller than the diameter $D_5$ of the microlens 602. This means that the light angle of divergence of light into the pinhole will still closely match the acceptance numerical aperture $NA_{MS}$ of the microscope.

The lens configurations described with respect to FIGS. 5, 6-1 and 6-2 are merely examples. It is contemplated that any optical system may be used that images the distal end of a multimode fiber onto, or sufficiently close to, the plane of the microlens array to achieve substantially uniform illumination at that plane. Furthermore, the proposed technology presented herein should not be considered limited to multi-focal confocal microscopes. For example, in the absence of a microlens array (i.e., in multiplexed confocal microscopy), the distal end of a multimode fiber may be imaged directly onto a pinhole array. As is typical in multiplexed confocal microscopy, without the microlens array, much of the light from the multimode fiber will not pass through the pinholes. Therefore, maintaining light rays parallel to the optical axis of the multimode fiber may be of little or no benefit in multiplexed confocal microscopy. However, the uniform illumination of the pinholes, and the resulting uniform illumination of the sample after the complete scan, will remain. Even in the absence of microlenses, the uniform illumination allows for some improvement in light utilization efficiency since there is no need to restrict the portion of the beam used for illumination. Similarly, in the absence of both microlenses and pinholes, it is contemplated that any optical system may be used that images the distal end of a multimode fiber onto, or sufficiently close to, the plane of the sample to achieve substantially uniform illumination at that plane.

In Operation:

Operation of the multi-focal confocal microscope system 300 illustrated in FIG. 3 will now be described for the case that a core of the multimode fiber 208 has a circular cross section.

The radiation sources 218 generate radiation of different wavelengths in UV-visible-NIR spectral range. Optics of the light control and conditioning subunits 224 provide the radiation beam being guided into the incident end 220 of the multimode fiber 208 by the lens 222 with a preferably circular cross section of a predetermined diameter. In the case that the radiation sources 218 generate radiation beams of a circular cross section, the light control and conditioning subunits 224 may expand the light from the radiation sources 218, providing it with the predetermined diameter. In the case that the radiation sources 218 generate light beams of an elliptical cross section, the light control and conditioning subunits 224 may compensate the beam ellipticity and optimize beam diameter.

The folding mirror 232 and the dichroic mirrors 234 couple the laser beams of the predetermined diameter, providing a single multi-wavelength collimated beam of exciting radiation incident on the lens 222.

The lens 222 focuses the exciting radiation emitted by the radiation sources 218 onto the incident end 220 of the multimode fiber 208. The exciting radiation is guided from the incident end 220 through the multimode fiber 208 to the distal end 230. As the light is being guided through the multimode fiber 208, the vibrating mechanical driver 308 generates vibrations in a section of the multimode fiber 208, resulting in fast variations of the optical path lengths of individual rays in the multimode fiber 208, thereby randomizing the phase of light as it is guided through the multimode fiber 208.

The exciting radiation is emitted from the distal end 230 of the multimode fiber 208 and is turned into diverging rays with a maximum spread-angle dependent on the numerical aperture $NA_F$ of the multimode fiber 208. The light is then received by the light-coupling unit 236, where it passes through the lenses 242 and 244. The lenses 242 and 244 and the multimode fiber 208 have been configured to image the distal end 230 of the multimode fiber 208 onto, or sufficiently close to, the plane 352 of the microlens array disk 310 such that the radiant intensity of light at the plane 352 of the microlens array disk 310 is substantially uniform. Specifically, since the lenses 242 and 244 have been selected to provide a magnification equal to or greater than the minimum magnification $M_{min}$ according to Eqn. 11, the size of the image of the distal end 230 of the multimode fiber 208 at the plane 352 of the microlens array disk 310 is sufficient to illuminate with substantial uniformity all the pinholes 316 that are used by the detector 258 to construct the confocal image of the sample 248.

The imaged radiation at the microlens array disk 310 is collected by the microlenses 312 and focused onto the corresponding pinholes 316 in the pinhole array disk 314 after passing through dichroic mirror 254. The radiation exiting the pinhole array disk 314 is converged to the sample 248 by the objective lens 246.

Assuming the lenses 504 and 506 are examples of the lenses 242 and 244 respectively, and assuming that the microlens array 508 and the pinhole array 512 are examples of the microlens array disk 310 and the pinhole array disk 314, respectively, the paths of light rays emitted from the distal end 230 of the multimode fiber 208 and passing through the pinholes 316 of the pinhole array disk 314 may be similar to the example paths of the light rays illustrated in FIGS. 5 and 6.

Since the core diameter $D_F$ and the numerical aperture $NA_F$ of the multimode fiber 208 have been selected to approximately follow the relation of Eqn. 14, the etendue of light emitted from the distal end 230 of the multimode fiber 208 does not substantially exceed the etendue of light passing through the pinholes 316 of the pinhole array 314, thereby achieving efficient illumination of the sample 248.

A signal from the sample 248, for example a fluorescence signal, passes back through the objective lens 246, and is converged to the individual pinholes 316 of the pinhole array disk 314. The fluorescence signal passing through the individual pinholes 316 is reflected by the dichroic mirror 254, so as to be imaged onto a sensor (not shown) of the detector 258 via the relay lens 260.

The plane of the pinhole array disk 314, the sample plane 250, and a plane of an image sensor (not shown) of the detector 258 are arranged to be conjugate with each other optically. The pinhole array disk 314 is rotated jointly with the microlens array disk 310 at a constant speed, and a converged light spot on the sample 248 is scanned with the pinholes 316 moved by the rotation. An optical sectional image, that is a confocal image, of the sample 248 is imaged onto the image sensor of the detector 258. After a complete scan in which the pinholes 316 are rotated, the sample 248 is uniformly illuminated.

The examples described with respect to FIGS. 2 and 3 include three radiation sources and three light control and conditioning subunits. Alternatively, it is possible to include one or more radiation sources and provide as many different wavelengths of the exciting radiation. It is also possible to improve the signal-to-noise ratio of the images if a radiation source with only one of the wavelengths is selected and put into use by the switching means and fluorescent light is received in a time division manner.

Example Calculations for Circular Core Multimode Fiber

Example calculations of the optics of the multi-focal confocal microscope system 300 with the multimode fiber 208 having a core of circular cross section will now be presented. The following calculations will be done for the multimode fiber 208 having a core diameter of 200 μm. This is a common core diameter that is commercially available.

In this example, the properties of the multi-focal confocal microscope system 300 are as follows: the diameter of $D_5$ of the microlenses 312 is equal to 0.25 mm; the focal length $F_5$ of the microlenses 312 is equal to 10 mm; the diameter $D_P$ of the pinholes 316 is equal to 50 μm; and the acceptance numerical aperture $NA_{MS}$ of the microscope 238 is equal to 0.0125 (where the numerical aperture of the microlenses 312 is designed to match that of the microscope 238). The detector 258 and the microscope 238 used in this example dictate that the illuminated area on the microlenses 312 should be at least $D_x$ by $D_y$ where $D_x = D_y = 10$ mm.

Given the diameter $D_5$ of the microlenses 312 and the dimension $D_x$, the total number $N_t$ of microlenses 312 to be illuminated along one dimension is $N_t = D_x/D_5 \cong 10$ mm/0.25 mm=40. Assuming the maximum exit angle $\theta_1$ is substantially equal to the numerical aperture $NA_F$ of the multimode fiber 208, that is $\theta_1 \cong NA_F$, Eqn. 14 dictates that the numerical aperture $NA_F$ of the multimode fiber 208 should not substantially exceed $NA_F \cong \sqrt{2} * N_t * NA_{MS} * D_P/D_F \cong 1.41 * 40 * 0.0125 * 50$ μm/200 μm ≅ 0.176.

A numerical aperture $NA_F$ of 0.176 may be achieved either by the design of the fiber core-cladding index differential or by coupling into a larger numerical aperture fiber at a smaller numerical aperture than the design numerical aperture. In practice, it may be desired to use a slightly smaller numerical aperture than that calculated using Eqn. 14 in order to account for alignment errors and deviations from the ideal assumptions used to derive Eqn. 14. A reasonable value might be $NA_F = 0.15$.

Although this example uses a multimode fiber with a core diameter of 200 μm, it is contemplated that a smaller or larger core diameter which is technically reasonable may be used if the limiting condition of Eqn. 14 is approximately satisfied.

With the multimode fiber 208 having a core diameter $D_F$ equal to 200 μm, the minimum magnification $M_{min}$ of the lenses 242 and 244 is calculated according to Eqn. 11 as $M_{min} \cong \sqrt{2} * N_t * D_5/D_F \cong (1.41 * 10$ mm/0.2 mm$) \cong 70.5$. This minimum magnification $M_{min}$ will exactly illuminate the diagonal of the sample 248 such that the image of the sample 248 on the detector 258 fills the active region of the detector 258. In practice, a magnification M that is slightly larger than the minimum magnification $M_{min}$, for example M=75, might be used to ensure that all of the pinholes used to construct the confocal image are illuminated in the presence of any small misalignments of the optics.

Given the lenses 242 and 244 with a magnification M equal to 75 and the multimode fiber 208 with a numerical aperture $NA_F$ equal to 0.15, it is possible to confirm that exciting radiation will pass efficiently through the pinholes 316. According to Eqn. 7, the diameter of the geometric spot size at the pinholes 316 is equal to twice the product of the numerical aperture at the microlenses 312 ($NA_F/M$) and the focal length $F_5$ of the microlenses 312, that is $2*(NA_F/M)*F_5 = 2*(0.15/75)*10$ mm=40 μm. Given that the diameter $D_P$ of the pinholes 316 is 50 μm, it follows that the exciting radiation will pass efficiently through the pinholes 316.

In general, it is desired to keep the focal lengths $F_3$ and $F_4$ of the lenses 242 and 244 as small as possible to reduce the size of the optical system. For example, the lens 242 may be chosen to have a focal length $F_3$ of 3 mm since this value is not too difficult to manufacture. According to Eqn. 4, it is desired that the ratio of the focal length $F_3$ of the lens 242 over the focal length $F_4$ of the lens 244 is equal to the magnification M. Therefore, the focal length $F_4$ of the lens 244 is calculated as $F_4 = M*F_3 = 75*3$ mm=225 mm. It follows that the lens 242 should be placed a distance $U_1 = F_3 = 3$ mm from the distal end 230 of the multimode fiber 208; the lens pair 242 and 244 should be separated by a distance $U_3 = F_3 + F_4 = 3$ mm+225 mm=228 mm; and the microlens array disk 310 should be placed a distance $U_2 = F_4 = 225$ mm from the lens 244.

This example was initiated using a given core diameter $D_F$ of the multimode fiber 208 equal to 200 μm. As discussed previously with respect to Eqn. 14, it is the product of the core diameter $D_F$ and the numerical aperture $NA_F$ of the multimode fiber 208 that is limited by the right-hand side of Eqn. 14. Therefore, it would have been just as valid to initiate the example calculations using a given numerical aperture $NA_F$ and then calculating the desired core diameter $D_F$.

It should be noted that the core diameter $D_F$ of a specific fiber is always fixed. However, it is possible to obtain a smaller effective numerical aperture $NA_F$ as compared to the actual numerical aperture $NA_F$. This can be done, for example, by under filling the input numerical aperture of the multimode fiber when coupling light into the multimode fiber. Accordingly, there is a small amount of room to adjust the numerical aperture $NA_F$ as seen by the multi-focal confocal microscope.

Example Calculations for Square or Rectangular Core Multimode Fiber

Example calculations of the optics of the multi-focal confocal microscope system 300 with the multimode fiber 208 having a core of square or rectangular cross section will now be presented. The following calculations will be done for the multimode fiber 208 having a square core of side length 125 μm. The remaining parameters are the same as those used in the previous example for the circular core fiber, including the diameter $D_5$ of the microlenses 312 equal to 0.25 mm, the focal length $F_5$ of the microlenses 312 equal to 10 mm, the diameter $D_P$ of the pinholes 316 equal to 50 μm, the acceptance numerical aperture $NA_{MS}$ of the microscope 238 equal to 0.0125, and the dimensions of the area to be illuminated on the microlens array 310 equal to $D_x$ by $D_y$, where $D_x=D_y=10$ mm. As in the previous example, the total number $N_t$ of microlenses 312 or pinholes 316 along one dimension is $N_t=D_x/D_5=10$ mm/0.25 mm=40.

In this case, Eqn. 15 is used to determine that the numerical aperture $NA_F$ of the multimode fiber 208 should not substantially exceed $NA_F \cong N_t*NA_{MS}*D_P/D_F \cong 40*0.0125*50$ μm/125 μm≅0.2. As in the previous example, it may be desired to use a slightly smaller numerical aperture than that calculated using Eqn. 15 in order to account for alignment errors and deviations from the ideal assumptions used to derive Eqn. 15. A reasonable value might be $NA_F=0.18$.

The minimum magnification $M_{min}$ should be a ratio of the desired image size to the relevant dimension of the multimode fiber 208. According to Eqn. 12, for a multimode fiber with a square or rectangular core, the minimum magnification $M_{min}$ is calculated as $M_{min}=N_t*D_5/D_F=(10$ mm/0.125 mm$)=80$. As with the circular core fiber, the magnification M may be made a somewhat larger than the minimum magnification $M_{min}$ to provide some tolerance to alignment errors. A magnification M=85 is a reasonable choice.

Given the lenses 242 and 244 with a magnification M equal to 85 and the multimode fiber 208 with a numerical aperture $NA_F$ equal to 0.18, it is possible to confirm that exciting radiation will pass efficiently through the pinholes 316. According to Eqn. 7, the diameter of the geometric spot size at the pinholes 316 is equal to twice the product of the numerical aperture at the microlenses 312 ($NA_F/M$) and the focal length $F_5$ of the microlenses 312, that is $2*(NA_F/M)*F_5=2*(0.18/85)*10$ mm=42 μm. This confirms that the exciting radiation will pass efficiently through the 50-μm pinholes 316.

If the focal length $F_3$ of the lens 242 is chosen to be 3 mm, the focal length $F_4$ of the lens 244 is calculated according to Eqn. 4 as $F_4=M*F_3=85*3$ mm=255 mm. It follows that the lens 242 should be placed a distance $U_1=F_3=3$ mm from the distal end 230 of the multimode fiber 208; the lenses 242 and 244 should be separated by a distance $U_3=F_3+F_4=3$ mm+255 mm=258 mm; and the lens 244 should be placed a distance $U_4=F_4=255$ mm from the microlens array disk 310.

The technique of imaging a distal end of a multimode fiber to provide substantially uniform illumination is not limited to multiplexed confocal microscopy using a microlens array. The techniques described to produce uniform illumination may be used in multiplexed confocal microscopy where a pinhole array is used without a microlens array, or in any microscope system that benefits from uniform, wide-area illumination. Microscopy techniques that can be used include, but are not limited to, wide-field imaging, fluorescence recovery after photo-bleaching (FRAP), fluorescence lifetime imaging (FLIM), structured illumination (SIM), photo-activated localization microscopy (PALM) and stochastic optical reconstruction microscopy (STORM).

In wide-field and bright field microscopy the image of a distal end of a multimode fiber may be imaged onto a sample of a microscope. Intermediate optics between the distal end of the multimode fiber and the objective lens of the microscope may be used such that the distal end of the multimode fiber is imaged onto the sample. Alternatively, the distal end of the multimode fiber may be imaged to one or more planes conjugate to the sample plane. In the example of FIG. 2, the lenses 242 and 244 are used to image the distal end 230 of the multimode fiber 208 to the conjugate plane 252. The uniform illumination at the conjugate plane 252 is imaged by the microscope onto the sample 248, thus providing substantially uniform illumination of the sample 248. In PALM or STORM methods, the distal end 230 of the multimode fiber 208 is imaged onto the sample 248 in the same way as wide-field or bright field microscopy. An alternate method of wide-field microscopy may be achieved in the configuration of FIG. 3 with the pinhole apertures 316 being made very large or by the removal of the pinhole array disk 314 altogether.

In a FRAP system, a distal end of a multimode fiber may be imaged onto a plane that is conjugate to the plane of a sample. Uniform illumination is then present at the conjugate plane. A section of the substantially uniform illumination is selected by the FRAP system. The section selected corresponds to the sections of the sample that will be photobleached. Selection may be achieved with a digital micromirror device, physical aperture or other techniques known to those skilled in the art. The selected sections in the conjugate plane are transferred by an objective lens to the sample with uniform illumination across the selected section.

The FLIM technique measures the fluorescence lifetime at a specific point in a sample. In some implementations of FLIM, the sample is illuminated in an area sufficient to substantially illuminate the area of the microscope image. The incoming illumination is time modulated with pulsed, sinusoidal or otherwise time selective modulation. Imaging a distal end of a multimode fiber onto the sample or to a plane conjugate to the sample plane may provide substantially uniform illumination of the sample. Time modulation may be applied to the illuminating light either before coupling to the multimode fiber or after exiting the multimode fiber. Modulating methods that may be used include, but are not limited to, directly modulating light emitted from the radiation source or plurality of radiation sources, placing a modulation means between the radiation source or plurality of sources and the multimode fiber, or by placing a modulation means after the distal end of the multimode fiber.

Structured illumination, or patterned illumination, or 3D structured illumination microscopy (3D-SIM), applies a pattern or structure to the microscope illumination. Multiple images with different patterns are exposed separately and an image processing means is used to reconstruct an image that can exceed the diffraction limit of a traditional microscope. More advanced patterning techniques can be used to recover sectioned images of the sample. Imaging a distal end of a multimode fiber onto a plane conjugate to the sample plane may produce uniform illumination for the structured illumination. The uniform illumination at the conjugate image plane is patterned with various techniques known to those skilled in the art and the subsequently patterned illumination is imaged onto the sample.

While certain features of the technology have been illustrated and described herein, many modifications, substitutions, changes, and equivalents will now occur to those of ordinary skill in the art. It is, therefore, to be understood that the appended claims are intended to cover all such modifications and changes.

What is claimed is:

1. A method comprising:
    imaging a distal end of a multimode fiber (i) onto a sample plane, or (ii) sufficiently close to the sample plane such that a radiant intensity of light at the sample plane is substantially uniform,
    wherein a transverse distribution of light exiting the distal end is substantially uniform and the light exiting the distal end passes through a light-coupling unit before reaching the sample plane, and
    wherein the sample plane is a plane at which a sample is to be probed by a microscope, the microscope comprising at least an objective.

2. The method as claimed in claim 1, wherein the multimode fiber is a step-index multimode fiber.

3. The method as claimed in claim 1, wherein the light-coupling unit provides a magnification such that an area of substantially uniform illumination at the sample plane is not substantially bigger than an imaged area of the sample plane that is imaged by any active region of a multi-element detector.

4. The method as claimed in claim 1, wherein a core of the multimode fiber is of circular cross section.

5. The method as claimed in claim 1, wherein a core of the multimode fiber is of rectangular cross section.

6. The method as claimed in claim 1, wherein a core of the multimode fiber is of square cross section.

7. A method comprising:
    imaging a distal end of a multimode fiber (i) onto a conjugate plane, or (ii) sufficiently close to the conjugate plane such that a radiant intensity of light at the conjugate plane is substantially uniform,
    wherein a transverse distribution of light exiting the distal end is substantially uniform and the light exiting the distal end passes through a light-coupling unit before reaching the conjugate plane,
    wherein the conjugate plane is optically conjugate to a sample plane, and
    wherein the sample plane is a plane at which a sample is to be probed by a microscope, the microscope comprising at least an objective.

8. The method as claimed in claim 7, wherein the multimode fiber is a step-index multimode fiber.

9. The method as claimed in claim 7, wherein the light-coupling unit provides a magnification such that an area of substantially uniform illumination at the sample plane is not substantially bigger than an imaged area of the sample plane that is imaged by any active region of a multi-element detector.

10. The method as claimed in claim 7, wherein a core of the multimode fiber is of circular cross section.

11. The method as claimed in claim 7, wherein a core of the multimode fiber is of rectangular cross section.

12. The method as claimed in claim 7, wherein a core of the multimode fiber is of square cross section.

13. A microscope system comprising:
    a light-coupling unit to be optically coupled to a multimode fiber; and
    a microscope comprising at least an objective lens,
    (i) configured such that light exiting a distal end of the multimode fiber and passing through the light-coupling unit is imaged onto a sample plane or onto a conjugate plane or onto both, or
    (ii) configured such that light exiting the distal end and passing through the light-coupling unit is imaged sufficiently close to the sample plane or sufficiently close to the conjugate plane or sufficiently close to both such that a radiant intensity of the light at the sample plane or at the conjugate plane or at both is substantially uniform,
    wherein a transverse distribution of light exiting the distal end is substantially uniform,
    wherein the conjugate plane is optically conjugate to the sample plane, and
    wherein the sample plane is a plane at which a sample is to be probed by the microscope.

14. The microscope system as claimed in claim 13, further comprising the multimode fiber and wherein the multimode fiber is a step-index multimode fiber.

15. The microscope system as claimed in claim 13, further comprising the multimode fiber and wherein a core of the multimode fiber is of circular cross section.

16. The microscope system as claimed in claim 13, further comprising the multimode fiber and wherein a core of the multimode fiber is of rectangular cross section.

17. The microscope system as claimed in claim 13, further comprising the multimode fiber and wherein a core of the multimode fiber is of square cross section.

18. The microscope system as claimed in claim 13, wherein the light-coupling unit provides a magnification such that an area of substantially uniform illumination at the sample plane is not substantially bigger than an imaged area of the sample plane that is imaged by any active region of a multi-element detector.

19. The microscope system as claimed in claim 18, further comprising the detector.

* * * * *